United States Patent
Krotkov et al.

(10) Patent No.: US 10,198,514 B1
(45) Date of Patent: Feb. 5, 2019

(54) CONTEXT BASED SEARCH FILTERS

(71) Applicant: AMAZON TECHNOLOGIES, INC., Reno, NV (US)

(72) Inventors: Andrei N. Krotkov, Seattle, WA (US); Daniel Dwight Longley, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 536 days.

(21) Appl. No.: 14/458,708

(22) Filed: Aug. 13, 2014

(51) Int. Cl.
  G06F 17/30 (2006.01)
  G06Q 30/06 (2012.01)

(52) U.S. Cl.
  CPC ... G06F 17/30867 (2013.01); G06Q 30/0625 (2013.01)

(58) Field of Classification Search
  USPC ....... 707/608, 610, 640, 661, 664, 674, 692, 707/964
  See application file for complete search history.

(56) References Cited

U.S. PATENT DOCUMENTS

| | | | |
|---|---|---|---|
| 2008/0162305 A1* | 7/2008 | Rousso | G06Q 10/0631 705/26.5 |
| 2011/0258049 A1* | 10/2011 | Ramer | G06F 17/30867 705/14.66 |
| 2013/0041781 A1* | 2/2013 | Freydberg | G06Q 30/06 705/27.1 |

\* cited by examiner

*Primary Examiner* — Sana A Al-Hashemi
(74) *Attorney, Agent, or Firm* — Lindauer Law, PLLC

(57) ABSTRACT

Techniques are described for dynamically generating filter controls that enable the filtering of content items presented in a user interface such as a web application. In response to a request for content, one or more content items may be provided. The content item(s) may be analyzed to determine one or more attributes that describe the content item(s). The filter control(s) may then be determined dynamically based on the attribute(s) of the content item(s). The filter control(s) may be presented in the same user interface with the content item(s) to enable filtering of the content item(s) based on the attribute(s). The filter control(s) may be determined based on user behavior data, user demographic data, social network data, historical sales information, or other information.

20 Claims, 11 Drawing Sheets

CONTEXT BASED SEARCH FILTERS

BACKGROUND

To increase sales or web site traffic, online merchants and other providers of online services may seek to improve the experience of users visiting their web sites. In some cases, improvements to a user experience may include providing faster and easier ways for users to search a product catalog and identify products for purchase. In cases where a web site provides a wide variety of products and services for customers, it may be a challenge to provide such an expedited search capability.

Figure 1:
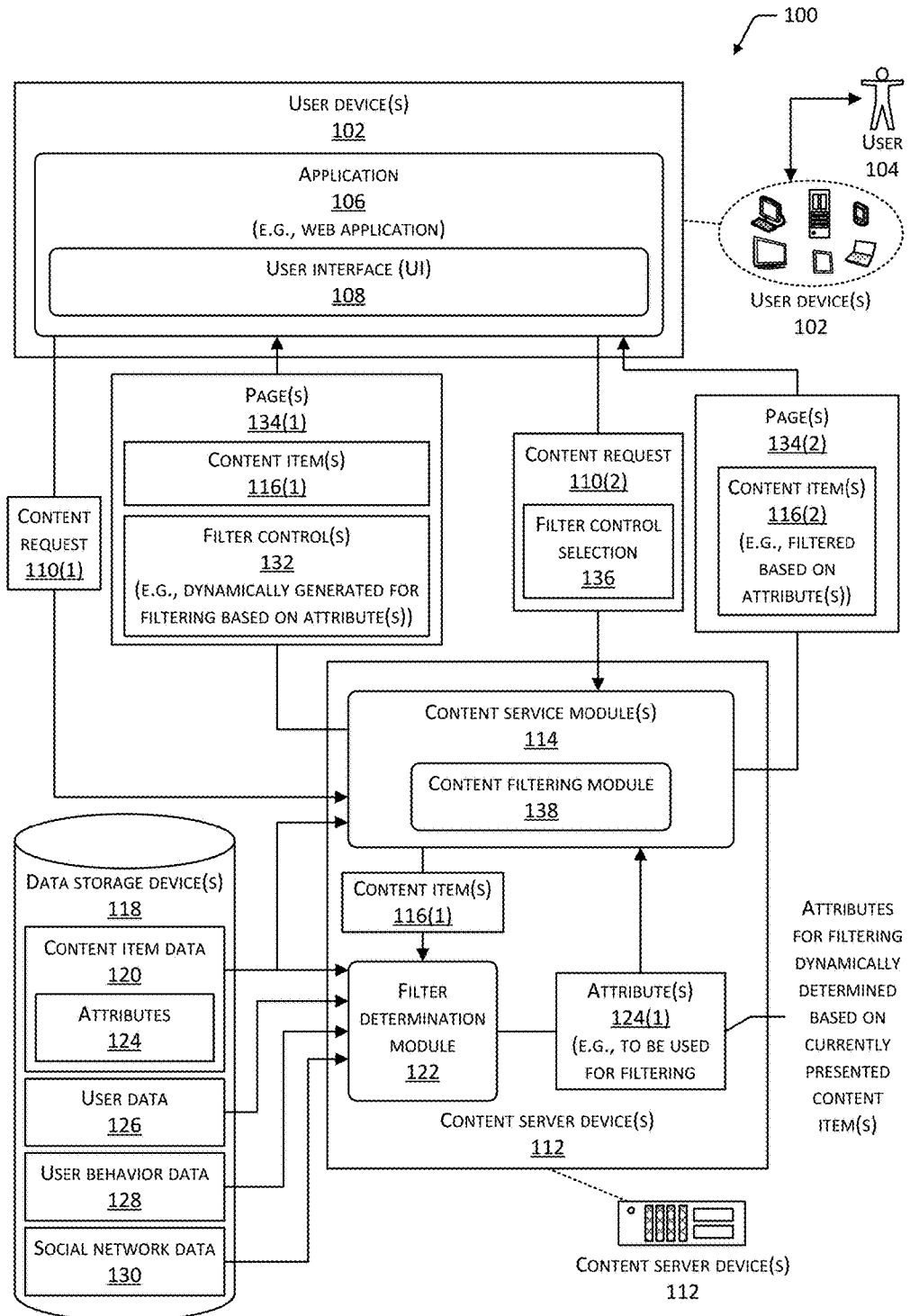
FIG. 1 depicts an environment for dynamically determining one or more filter controls for filtering content items presented in a user interface, based on attributes of the content items.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for filtering content items presented in a user interface (UI), the filtering based on a dynamic analysis of attributes associated with the content items. In some implementations, a first set of one or more content items may be presented to a user within a UI on a user device, such as within one or more web pages presented in a web browser. The first set of content item(s) may be presented in response to a request that originates from the UI based on one or more commands or other information provided by the user. For example, the user may search a web site for content item(s) corresponding to a particular set of search terms, categories, classes, genres, and so forth. One or more content server devices may receive the request, analyze the request to determine the first set of content item(s), and communicate the first set of content item(s) to the user device for presentation in the UI. In some cases, the content item(s) may be product(s) that are made available for purchase or acquisition by users through the UI.

In some implementations, the first set of content item(s) to be presented may be determined based on a search of one or more data storage systems that store the content item(s), and such a search may be based on one or more search indexes (i.e., indices) that were previously generated to facilitate such a search. Alternatively, the first set of content item(s) may be determined based on the user's request for a curated (e.g., previously generated) collection of content item(s). For example, the UI may present a series of links describing curated collections of content items, such as "New Bestselling Novels", "Favorite Birthday Gifts for Dad", and so forth. The user may select one of the links to generate a request for one or more content items included in the curated collection. Accordingly, the first set of content item(s) may be determined for presentation in the UI based on previously implemented content retrieval mechanisms such as previously generated search indexes or curated collections of content item(s).

In some implementations, the first set of content item(s) may be analyzed to determine one or more attributes that describe one or more of the first set of content item(s). In some cases, the attribute(s) may be stored as data, or metadata, associated with the content item(s) stored in the data storage system(s). The attribute(s) of a content item may include, but are not limited to, one or more of the following:

Attributes describing an appearance or design of the content item(s), such as dimension(s) (e.g., height, width, length, weight, radius, etc.), size(s) (e.g., apparel size, jewelry size, etc.), color(s), shape(s), chirality (e.g., left-handed or right-handed), patterns (e.g., cross-hatch, solid colors, striped, etc.), and so forth;

Attributes describing the capabilities of the content item(s), such as technical specifications, supported languages for localized software, supported languages for translated textual, audio, or video content, supported languages for subtitled or dubbed video content, and so forth;

Attributes describing the intended or recommended use of the content item(s), such as a recommended age range for product users, and so forth;

Attributes describing a type, category, class of the content item(s) (e.g., clothing, toys, books, video games, etc.), or a genre or subcategory of the content item(s) (e.g., non-fiction books, puzzle-based video games, board games, children's clothing, etc.), and so forth; or Attributes describing other aspects of the content item(s), such as a price, estimated shipping time, availability, product reviews (e.g., by other customers or publications), release date, period of availability, item number, catalog number, product identifier, brand, manufacturer, seller, and so forth.

An attribute may be associated with one or more values. For example, a yellow content item may have a color attribute with the value of "yellow". As another example, a content item that is a particular brand and model of toy car may have a category or type attribute with the values of "toy", "toy car", "toy vehicle", "model", and so forth.

Based on the request for the first set of content item(s), implementations may access content item data describing one or more attributes for at least some of the first set of content item(s). One or more of the attribute(s) may be identified as attribute(s) on which the first set of content item(s) may be filtered. For example, a user may request a list of toys to be presented through the UI, and those toys may be associated with a recommended age attribute (e.g., toys recommended for ages 0-5, ages 6-17, ages over 17, etc.). The recommended age attribute may be identified as an attribute on which the content item(s) may be filtered. Implementations may then generate one or more filter controls to enable a user to request that the content item(s) be filtered based on the attribute(s). The filter control(s) may be presented in the UI along with the first set of content item(s). For example, the UI may include a list of radio buttons, check boxes, toggle switches, or other types of filter control(s) that enable the user to filter the presented toys based on the recommended age 0-5, recommended age 6-17, recommended age over 17, and so forth.

In some implementations, the determination of the attribute(s) to be used for filtering, and the generation of the filter control(s), may be based at least in part on user behavior data describing previous interaction(s) with the UI, or on user data describing (e.g., demographic) characteristics of the user. Some implementations may also employ social network data to determine which attribute(s) to use for filtering and which filter control(s) to present. Such social network data may describe one or more activities of user(s) within a social network (e.g., posts, likes, etc.), or one or more connections between the user and other individuals (e.g., friends, family, acquaintances, etc.).

Based on the user's selection of one or more of the filter controls, the presented content item(s) may be filtered to present a second set of content item(s). The second set of content item(s) may be the subset of the first set of content item(s) corresponding to the selected filter control(s). For example, the user may select the filter control for recommended age 6-17. In response the UI may present those content item(s) for which the recommended age attribute is within (or overlaps with) the range 6-17, and not present other content item(s).

In some implementations, the determination of the filter control(s) may be performed substantially in real time with, or dynamically with respect to, the request for the first set of content item(s). Real time operations may be performed within a predetermined (e.g., short) period of time following a triggering event or scenario. For example, in some implementations the request for the first set of content item(s) may cause one or more operations to generate the filter control(s), and such operation(s) may be performed within a predetermined period of time following the request. The operation(s) to generate the filter control(s) may include the analysis of the content item(s) to determine their attribute(s), the selection of one or more of the attribute(s) to be employed in filtering, and the generation of the filter control(s) to enable the filtering based on the selected attribute(s). Such processing to determine the filter control(s) may be performed within a predetermined period of time following the receipt of the request for the first set of content item(s).

Further, in some implementations the processing to determine the filter control(s) may be performed dynamically with respect to the determination of the first set of content item(s) following the receipt of the request for the first set of content item(s). Dynamic operations may be launched within a same execution path, or synchronously with, a triggering event or scenario. For example, in some implementations the process that receives and analyzes the request for the first set of content item(s) may perform the operations to generate the filter control(s), or may spawn one or more sub-processes or threads that perform such operations, such that the generation of the filter control(s) is performed within a same execution path as the receipt and processing of the request for the first set of content item(s). Such dynamic and real time processing to generate the filter control(s) may contrast with asynchronous, offline, or static processing to generate search indexes or curated collections of content items.

Through the dynamic, real time determination of filter control(s) based on the attribute(s) of the presented content item(s), implementations may provide users with a more extensive and more flexible content item filtering capability than may otherwise be provided through the use of manually generated search indexes or manually curated content item collections. For example, implementations may enable the filtering of content item(s) based on any attribute of the content item(s), not limited to those attributes for which a search index has been previously built or for which a content item collection has been previously curated. In this way, implementations may provide an enhanced user experience.

Implementations support any type or format of data within the content item(s), including but not limited to one or more of the following:

Text content, including any amount of alphanumeric or symbolic character text described using any character set or code page, such as any version or subset of the Unicode character standard. Text components may also include metadata described using a markup language, such as any version of Hypertext Markup Language (HTML), Dynamic HTML (DHTML), Extensible HTML (XHTML), Extensible Markup Language (XML), and so forth;

Script files or program modules that provide dynamic content using any scripting or programming language, including any version of JavaScript™, VBScript™, Peri™, Common Gateway Interface (CGI), Cascading Style Sheets (CSS), other types of style sheets, and so forth;

Image files in any format, such as a version of the Joint Photographic Experts Group (JPEG) format, the Graphics Interchange Format (GIF), the Bitmap (BMP) image file format, and so forth; or Audio, video, audio-visual, or multimedia content files in any format, such as a version of the Waveform Audio File Format (WAV), the AU file format, the Moving Picture Experts Group (MPEG) formats such as MPEG-1, MPEG-2, MP3, or MPEG-4 formats, the Audio Video Interleave (AVI) format, and so forth.

FIG. 1 depicts an environment 100 in which implementations may operate. As shown in FIG. 1, the environment 100 may include one or more user devices 102. The user device(s) 102 may comprise any type of computing device, including but not limited to a personal computer, a smartphone, a tablet computer, a wearable computer, an implanted computer, a mobile gaming device, an electronic book reader, an automotive computer, a desktop computer, a laptop computer, a game console, a home entertainment device, a network computer, a server computer, a mainframe computer, a distributed computing device (e.g., a cloud server), and so forth. Although examples herein may describe the user device(s) 102 as physically separate device(s), implementations are not so limited. In some cases, the user device(s) 102 may include one or more of a virtual computing environment, a hypervisor, a device emulation, or a virtual machine executing on one or more physical computing devices. The user device(s) 102 are described further with reference to FIG. 5. Each of the user device(s) 102 may be employed by one or more users 104.

Each of the user device(s) 102 may execute any number of applications 106 that are installed on or otherwise present on the user device(s) 102. In some cases, the application(s) 106 may include web application(s) configured to execute at least partly within a web browser on the user device(s) 102. Such web application(s) may include any number of web pages that comprise a web site or web service. In such cases, the application(s) 106 may be described using a markup language such as any version of HTML, DHTML, XML, XHTML, and so forth. The application(s) 106 may also be described using one or more programming languages to provide dynamic content within one or more web page(s). The programming language(s) may include any version of JavaScript™, VBScript™ Perl™, CGI, CSS, other types of style sheets, and so forth. The application(s) 106 may also be written using any compiled or interpreted programming language, including but not limited to Java™, Objective-C™, C++, C, and so forth. In some implementations, the application(s) 106 may include native application(s) that are designed and written to execute on the user device(s) 102 outside of a web browser. Such application(s) 106 may also be written using any programming language, including compiled or interpreted programming languages.

The application(s) 106 may include a UI 108 to present information to the user(s) 104 and to receive information from the user(s) 104. The UI 108 may present information visually via a display or other component of the user device(s) 102. The UI 108 may present information audibly via speaker(s) or other audio output component(s) of the user device(s) 102. The UI 108 may also present information in a haptic format via haptic actuator(s) or other component(s) that enable a vibration or other movement of the user device(s) 102.

Implementations support application(s) 106 that are configured to provide any type of function or service to the user(s) 104. In some cases, the application(s) 106 may provide an online store or electronic commerce service to the user(s) 104 who are customers or consumers of products or services offered through the application(s) 106. The application(s) 106 may also provide other types of online services such as social networking services, communications services, online search services, and so forth.

The user 104 may provide commands or other information to the application 106 through the UI 108 to generate and send one or more content requests 110. In some cases, where the application 106 is a web application, the content request(s) 110 may be generated and sent through a web browser executing on the user device 102. In such cases, the content request(s) 110 may be specified according to a protocol such as a version of Hypertext Transport Protocol (HTTP), HTTP Secure (HTTPS), File Transfer Protocol (FTP), and so forth. In some cases, the content request(s) 110 may include any number of HTTP requests, such as HTTP POSTs, GETs, PUTs, and so forth. The content request(s) 110 may include a Uniform Resource Identifier (URI), such as a Uniform Resource Locator (URL) or Uniform Resource Name (URN) that provides a network location of page(s) that include the requested content. The content request(s) 110 may also include any number of parameters, attributes, cookies, or other information.

The content request(s) 110 may be communicated from the user device(s) 102 to one or more content server device(s) 112 over one or more networks. The content server device(s) 112 may include any type of computing device, including but not limited to any of the types of computing devices listed with reference to the user device(s) 102. In some cases, two or more of the content server devices 112 may comprise a cluster, cloud, farm, or other grouping of multiple devices that coordinate operations to provide load balancing, failover support, parallel processing capabilities, shared storage resources, or other aspects. Although examples herein may describe the content server device(s) 112 as physically separate devices, implementations are not so limited. In some cases, the content server device(s) 112 may include one or more of a virtual computing environment, a hypervisor, a device emulation, or a virtual machine executing on one or more physical computing devices. The content server device(s) 112 are described further with reference to FIG. 6.

In some implementations, a first content request 110(1) may be sent from the user device 102 to the content server device(s) 112. The first content request 110(1) may be generated based on the user 104 specifying, through the application 106, one or more search terms to be used for searching a database or other data storage for content item(s) corresponding to the search term(s). In some cases, the search may employ one or more previously built search indexes. In some cases, the first content request 110(1) may be generated based on the user 104 requesting content item(s) that are included in a curated (e.g., previously, manually assembled) collection of content items. The content request 110(1) may be received and processed by one or more content service module(s) 114 executing on the content server device(s) 112.

Based on the content request 110(1), the content service module(s) 114 may determine a first set of content item(s) 116(1) corresponding to the content request 110(1). In some cases, the first set of content item(s) 116(1) may be determined based on a search performed by one or more data storage devices 118 over content item data 120 stored in the data storage device(s) 118. The search may be based on one or more search terms specified in the content request 110(1) as a search query or otherwise. In some cases, the search may employ one or more previously generated search indexes that are stored on the data storage device(s) 118. In some cases, the first set of content item(s) 116(1) may be included in a curated collection of items, and the content request 110(1) may specify a particular curated collection to be presented in the UI 108. In such cases, data storage device(s) 118 may store information describing which content item(s) 116(1) are included in the requested curated collection. In some cases, a curated collection may have been previously and manually created (e.g., by personnel associated with the content server device(s) 112 or the content service module(s) 114) as a collection of any number of content item(s) 116

The data storage device(s) 118 may provide data storage on any number of databases or datastores, implemented as software, hardware, or a combination of software and hardware. The data storage may comprise any number of tables, arrays, structured lists, trees, or other data structures. The data storage device(s) 118 may provide data storage in any relational or non-relational data storage format. Although the data storage device(s) 118 are depicted as external to the content server device(s) 112, implementations are not so limited. In some implementations, the data storage device(s) 118 may be at least partly incorporated into the content server device(s) 112.

The first set of content item(s) 116(1) may be provided from the content service module(s) 114 to a filter determination module 122 executing on the content server device(s) 112. In some implementations, the filter determination module 122 may dynamically analyze the content item(s) 116(1) to determine one or more filter controls that may be displayed with the first set of content item(s) 116(1). In some implementations, the filter determination module 122 may access the content item data 120 stored on the data storage device(s) 118 and identify one or more attributes 124 associated with at least one of the content item(s) 116(1). The filter determination module 122 may select one or more of the associated attributes 124, and designate one or more attributes 124(1) to be used for filtering the content item(s) 116(1). In some cases, the attribute(s) 124(1) may be selected based at least partly on one or more of user data 126, user behavior data 128, or social network data 130. The attribute(s) 124(1) may be provided to the content service module(s) 114, which may dynamically generate one or more filter controls 132 based on the attribute(s) 124(1). The generated filter control(s) 132 may be included with the content item(s) 116(1) in one or more page(s) 134(1) (e.g., web page(s)) communicated to the user device 102. In some cases, the filter control(s) 132 may be described using a markup language or programming language, and may include any type of UI control such as a button, radio button, list, checkbox, and so forth.

On receiving the page(s) 134(1), the application 106 may present the page(s) 134(1) within the UI 108. The user 104 may then select any number of the presented filter control(s) 132 to indicate that the first set of content item(s) 116(1) is to be filtered to determine a second set of content item(s) 116(2). The second set of content item(s) 116(2) may be a subset of the first set of content item(s) 116(1) associated with one or more of the attribute(s) 124(1). The determination of a subset of the content item(s) 116 may be described as filtering. In some implementations, a content request 110(2) may be generated by the application 106, and the content request 110(2) may include a filter control selection 136 indicating which, if any, of the filter control(s) 132 have been selected by the user 104.

The content request 110(2) may be sent from the user device 102 to the content service module(s) 114 executing on the content server device(s) 112. On receiving the content request 110(2), the content service module(s) 114 may employ a content filtering module 138 to filter the first set of content item(s) 116(1) and thus determine the second set of content item(s) 116(2). The second set of content item(s) 116(2) may then be communicated to the user device 102 in one or more pages 134(2) (e.g., web pages). The analysis of the content item(s) 116, the identification of the attribute(s) 124 to be employed for filtering, and the providing of the content item(s) 116 to the user device 102 are described further with reference to FIGS. 7-11.

In some implementations, the content request(s) 110 and the page(s) 134 served in response to the content request(s) 110 may be communicated within a same session. A session may include any number of communications between the user device 102 and the content server device(s) 112, describing any number of interactions between the user 104 and the application 106. In cases where the application 106 is a web application executing within a web browser, the session may be a HTTP session. In such cases, the content request(s) 110 may be HTTP requests (e.g., GET, PUT, POST, etc.) that conform to a version of HTTP, and they may be send using HTTP, HTTPS, or some other protocol. A session, such as an HTTP session, may comprise a sequence of network request-response transactions between the user device 102 and the content server device(s) 112. In some cases, the user device 102 or the application 106 may initiate a request by establishing a connection, such as a Transmission Control Protocol (TCP) connection, to a particular port on a content server device(s) 112. A server-side process may listen on the port for the request. On receiving the request, the server-side process may a respond with a status message, such as HTTP/1.1 200 OK in cases where the session is a HTTP session. In some cases, the response may include a requested resource such as the page(s) 134 or the content item(s) 116.

In some cases, a session may include any number of interactions between the user 104 and the application 106, for which the user 104 is authenticated to the application 106. Authentication may include the user 104 providing one or more credentials to the application 106, and the credential(s) being verified by the application 106, by process(es) executing on the content server device(s) 112, or by process(es) executing elsewhere. The credential(s) may include but are not limited to one or more of a user name, a password, a certificate, a passcode, an answer to a challenge question, a token, and so forth. A session may be described as any number of interactions between the user 104 and the application 106 following a particular instance of user authentication, such that the interaction(s) may trigger any number of communications between the user device 102 and the content service module(s) 114.

Implementations support various methods for determining which of the attribute(s) 124 associated with the first set of content item(s) 116(1) are designated as the attribute(s) 124(1) to be employed in the filter control(s) 132. In some cases, all of the attribute(s) 124 associated with the first set of content item(s) 116(1) may be used to generate the filter control(s) 132. Alternatively, in some implementations the determination of the attribute(s) 124(1) to be used for filtering may be based at least in part on one or more of the user data 126, the user behavior data 128, or the social network data 130. The user data 126 may describe one or more characteristics of the user 104, such as the user's age, location, language preference(s), gender, other demographic characteristics, group affiliation(s), hobbies, interests, and so forth. The user behavior data 128 may describe one or more previous activities of the user 104, such as one or more previous interactions of the user 104 with the application 106 or with other application(s). Such activities may include content item(s) that the user 104 has previously viewed (e.g., browsed), searched for, purchased, acquired, recommended, reviewed, or otherwise interacted with in some way.

The social network data 130 may describe one or more activities of the user 104 on one or more social networks (e.g., online social networks). Social network activities may include the user 104 posting or otherwise publishing information in which the user 104 indicates that he or she likes, dislikes, or otherwise has an opinion or an interest in a content item 120. The social network data 130 may also describe on or more other individuals or entities that are associated with the user 104 as friends, family members, acquaintances, coworkers, and so forth. In some implementations, other information such as web site click stream data, sales information, and so forth may be employed to select the attribute(s) 124(1) to be used for filtering. The selection of the attribute(s) 124(1) based on various types of data, and the generation of the filter control(s) 132 based on the attribute(s) 124(1), is described further with reference to FIGS. 2, 3, and 9-11.

Implementations support any number of iterations in which the user 104 specifies a content request 110 and the content service module(s) 114 serve a set of content item(s) 116 in response to the content request 110. In each iteration, the content request 110 may specify the filter control selection 136 indicating which of the currently presented filter control(s) 132, if any, have been selected by the user 104. In some cases, for each iteration the content service module(s) 114 may provide a different set of filter control(s) 132 to be presented within the application 106, and each set of filter control(s) 132 may be generated based on the user's previous selection(s) of filter control(s) 132 in previous iteration(s). In this way, implementations may at least partly simulate and automate the interpersonal interactions that may occur between a customer and a salesperson during an in-person shopping experience in which the salesperson is helping the customer select product(s) for purchase.

Although FIG. 1 depicts one or more content server devices 112 performing operations to process the content request(s) 110, dynamically determine the filter control(s) 132 to be presented, and deliver page(s) 134 of content to be presented on the user device 102, implementations are not so limited. In some implementations, one or more of the content server device(s) 112, such as front end servers, edge servers, web servers, and so forth, may receive and analyze the content request(s) 110 and deliver the page(s) 134. Others of the content server device(s) 112, such as back end servers, application servers, and so forth, may retrieve the content item(s) 116 from the data storage device(s) 118, analyze the content item(s) 116 to determine the filter control(s) 132, and compose the page(s) 134 to be delivered by the other (e.g., front end) servers. Implementations support any distribution of the processes described herein among any number of the content server device(s) 112.

Further, in some implementations at least a portion of the filtering may be performed on the user device 102 instead of, or in addition to, being performed on the content server device(s) 112. For example, the user's selection of one or more filter control(s) 132 may trigger processing that is performed on the user device 102 (e.g., client-side processing) to determine the second set of content item(s) 116(2) to be presented in the application 106. Such client-side processing may be performed by scripting elements included in the page(s) 134. In this way, implementations may enable filtering while omitting the second set of round-trip communications including the sending of the content request 110(2) and the receiving of the page(s) 134(2).

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 2:
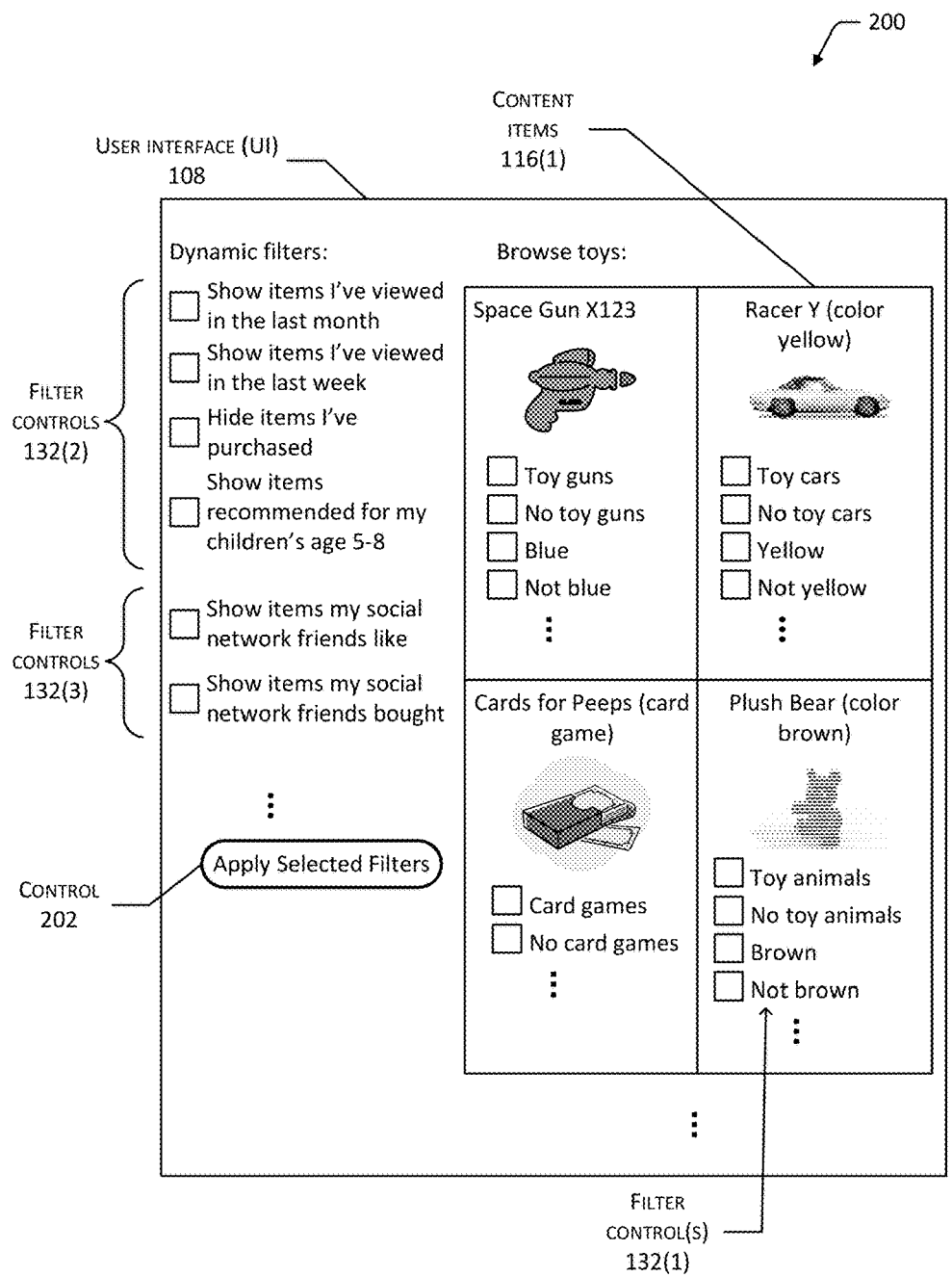
FIG. 2 depicts an example of a user interface configured to present a plurality of content items and a plurality of filter controls for filtering the presented content items.

FIG. 2 depicts an example 200 of the UI 108 arranged to present one or more content items 116 and one or more filter controls 132 with the page(s) 134(1). As shown in the example 200, UI 108 may present one or more filter control(s) 132(1) that have been determined for filtering based on one or more attributes 124(1) of the first set of content item(s) 116(1). Filtering based on an attribute 124(1) may include positive filtering to request the presentation of content item(s) 116 that include the attribute 124(1). Filtering may also include negative filtering to request the presentation of content item(s) 116 that do not include the attribute 124(1). For example, one of the first set of content item(s) 116(1), the "Space Gun X123", may include an attribute 124 that the content item 116(1) is associated with a category, class, type, or genre of product "toy gun". Based on this attribute 124, a filter control 132(1) labeled "Toy guns" may have been generated to enable the user 104 to request filtering for those content item(s) 116(1) having the attribute "toy gun". Moreover, a filter control 132(1) labeled "No toy guns" may also be generated to enable the user 104 to request filtering for those content item(s) 116(1) that do not have the attribute "toy gun". In this way, implementations support the generation of filter control(s) 132 that enable filtering in a Boolean fashion.

Implementations also enable filter control(s) 132(1) to be generated for filtering based on a predetermined set of possible values for an attribute 124. For example, as shown in FIG. 2 the content item 116(1) "Racer Y (color yellow)" has led to the generation of a filter control 132(1) labeled "yellow". This filter control 132(1) enables the user 104 to request that the content item(s) 116(1) be filtered for those having a color attribute 124 with a value of "yellow". In some cases, the color attribute 124 may have a predetermined set of possible values, such as the colors "green", "blue", "red", "orange", and so forth. In such cases, the content item 116(1) being associated with the color attribute 124 may lead to a generation of filter control(s) 132(1) for one or more of the possible color values of the attribute 124. As another example, a content item 116(1) may be an article of clothing having a size attribute 124 of "Extra Large". The size attribute 124 may trigger the generation of filter control(s) 132(1) for other possible values of the size attribute 124, such as "Extra Small", "Small", "Medium", "Large", and so forth. In some implementations, as depicted in FIG. 2, the filter control(s) 132(1) for filtering based on the attribute(s) 124 may be presented in proximity to or in a same UI element (e.g., frame) as the content item 116(1) having the corresponding attribute(s) 124.

In some implementations, the user behavior data 128 may be employed to determine one or more filter control(s) 132(2) to generate and present within the application 106. For example, the user behavior data 128 may describe one or more previous interactions of the user 104 with the application 106, in which the user 104 indicated an interest in filtering content item(s) 116 based on "no toy guns". Such interaction(s) may include the user 104 selecting the "no toy guns" filter control 132 during a previous browsing session in the application 106. In such cases, the filter control(s) 132(2) may include a "no toy guns" filter. The interaction(s) may also include the user 104 briefly viewing and then leaving a page 134 that presents product information for a toy gun. In cases where the user 104 spent a shorter than average time viewing such a page 134, an inference may be made that the user 104 is not interested in viewing information regarding toy guns or similar products. In such cases, the viewing time may be compared to the average amount of time that the user 104 generally spends viewing product pages, or an average amount of time that a wider population of users spends viewing product pages. Accordingly, implementations may analyze the user behavior data 128 to infer a level of interest of the user 104 in a particular content item 116. Based on the inferred level of interest in a particular content item 116, implementations may then infer a more general level of interest in other content item(s) 116 that have similar attribute(s) 124 to the particular content item 116. One or more filter control(s) 132(2) corresponding to the inferred interest(s), or lack of interest(s), may then be generated and presented in the UI 108. The filter control(s) 132(2) may also be generated based on other user behavior data 128, such as content item(s) 116 viewed by the user 104 in a recent time period such as the last day, week, month, and so forth. In some cases, the filter control(s) 132(2) may enable filtering to present, or hide, the content items 116 already purchased by the user 104.

In some implementations, the user data 126 may be employed to determine one or more filter control(s) 132(2) to be presented in the UI 108. In some cases, the user data 126 may indicate an age of the user 104, and one or more filter control(s) 132 may be generated to filter the content item(s) 116 according to a recommended age attribute 124 of the content item(s) 116. For example, based on the user 104 being 30 years old, implementations may generate a filter control 132 "ages 18 and over" to enable the presentation of content item(s) 116 for which the recommended age attribute 124 is at least 18. Moreover, in some cases the user data 126 may indicate that the user 104 is associated with another person of another age. For example, the user data 126 may indicate that the user 104 has one or more children in an age range from 5 to 8. Such information may have been previously provided by the user 104 or may have been inferred based on the previous activities of the user 104 (e.g., browsing or purchasing children's toys, etc.). In such cases, a filter control 132 may be generated to enable filtering based on the age(s) of the associated person(s) (e.g., children), as shown in FIG. 2.

Moreover, in some cases the level of interest of the user 104 in content item(s) 116 having particular attribute(s) 124 may be based on the user's activities described in the social network data 130, and one or more filter control(s) 132(3) may be provided to filter based on the inferred interest(s), or lack of interest(s). For example, the user 104 may have published information to a social network indicating that the user 104 liked an article criticizing the marketing of toy guns to children. Based on that activity, implementations may infer that the user 104 may prefer to filter content items 116 to exclude the presentation of content item(s) 116 having the attribute 124 "toy gun". Further, in some implementations one or more filter controls 132(3) may be presented to enable the user 104 to request filtering based on content item(s) 116 that his or her friends or contacts within a social network liked or disliked, based on content item(s) 116 that his or her friends recently purchased, or based on other information published through one or more social networks.

The determination of filter control(s) 132 may also be based on other considerations. For example, historical purchase data may be analyzed to determine which filter control(s) 132 have previously led to the sales of content item(s) 116 (e.g., products), and those filter control(s) 132 may be presented in the application 106. In some cases, the filter control(s) 132 that previously led to sales may be presented higher or more prominently in the list of filter control(s) 132 in the application 106.

The UI 108 may also include a control 202 to enable the user 104 to generate and send the content request 110(2) that includes the filter control selection 136 indicating which filter control(s) 132, if any, have been selected by the user 104.

Figure 3:
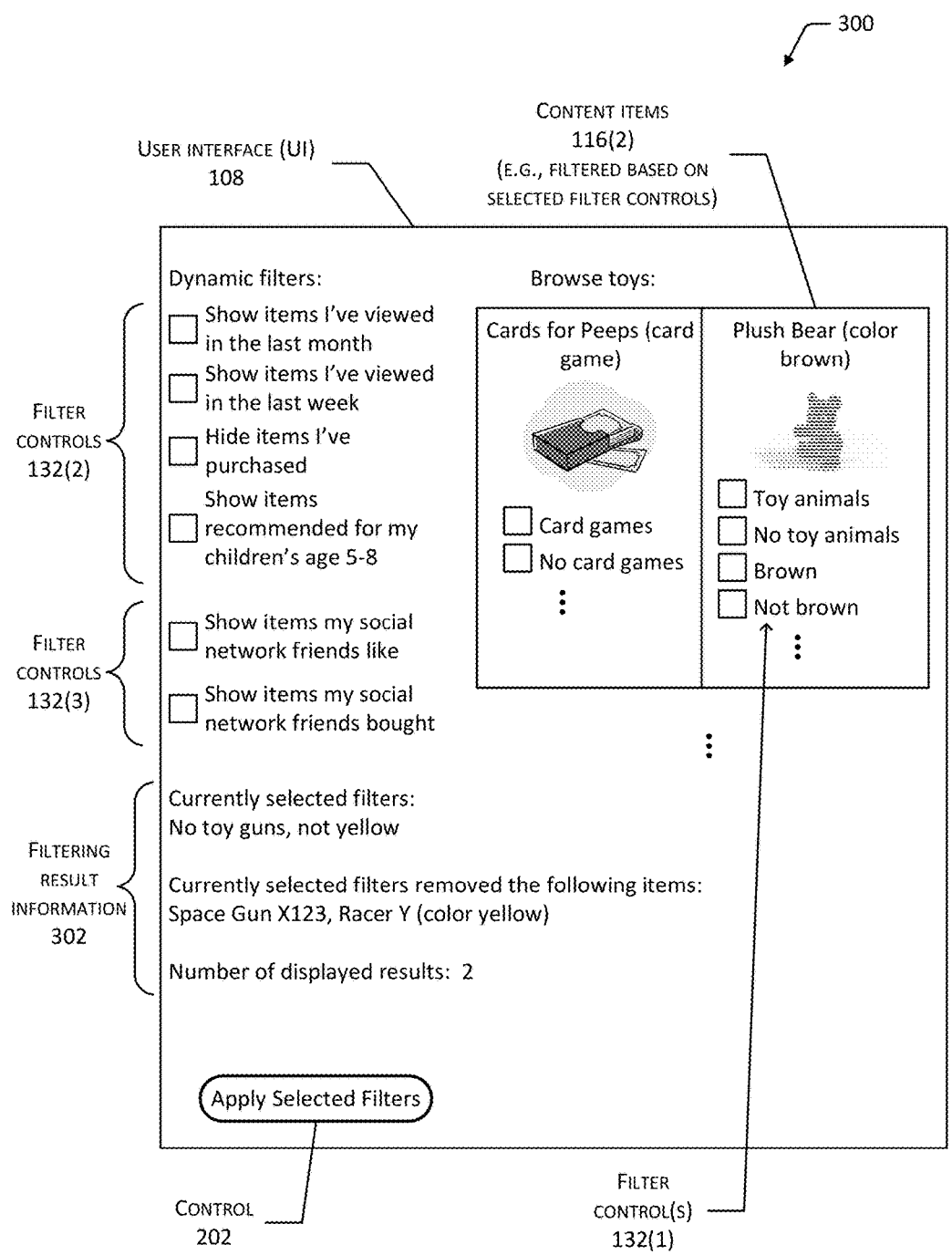
FIG. 3 depicts an example of a user interface in which filter controls have been selected to filter the presented content items.

FIG. 3 depicts an example 300 of the UI 108 in which the user 104 has selected one or more of the filter control(s) 132 to request filtering of the content item(s) 116(1), and the presented page(s) 134(2) indicate the selected filter control(s) 132. In the example 300, the user 104 has selected two of the filter controls 132(1) and the page(s) 134(2) have been generated to present a subset of the first set of content item(s) 116(1). This subset, the second set of content item(s) 116(2), includes those content item(s) 116 corresponding to the selected filter control(s) 132(1). For example, the user 104 has selected the filter control 132(1) "no toy guns" to exclude the presentation of toy guns, and the user 104 has selected the filter control 132(1) "not yellow" to exclude the presentation of content item(s) 116(1) having the color attribute 124 with value "yellow". Although FIGS. 2 and 3 depict a single iteration of content request 110 and page(s) 134 generated in response to the content request 110, implementations support any number of iterations in which the user 104 repeatedly requests various filter control(s) 132 to present different sets of content items 116. In some implementations, the UI 108 may present filtering result information 302 that describes a result of filtering the content item(s) 116 based on the selected filter control(s) 132. For example, the filtering result information 302 may indicate the filter control(s) 132 currently active and may indicate that one or more particular content item(s) 116 have been removed from the UI 108 based on the selected filter control(s) 132. In some implementations, the filter result information may also include a number of results such as the count of the content item(s) 116 currently presented based on the active filter control(s) 132.

Although the examples 200 and 300 depict the UI 108 as including particular controls and information in a particular arrangement in a UI window or view, implementations are not limited to these examples. Any type of control may be employed in the filter control(s) 132 and the control 202, including but not limited to buttons, text boxes, radio buttons, slider controls, tree views, list views, pop-up dialogs, checkboxes, and so forth. In some implementations, the filter control(s) 132 may be active portion(s) of the UI 108 such that the user 104 may select or de-select the filter control(s) 132 by clicking or gesturing within the particular active portion(s) of the UI 108. The application 106 may detect such clicks or gestures and interpret them as the user 104 selecting or de-selecting (e.g., toggling) the filter control(s) 132. Implementations also support the use of audio input(s), haptic input(s), or other types of non-visual inputs to the UI 108. The information presented through the UI 108 may be presented according to any format or data type, including visual output, audio output, haptic output, or other types of output. The controls and other information may be presented in any time sequence, in any position, or in any arrangement, and may be distributed across any number of pages, windows, views, or dialogs. Although the examples 200 and 300 depict the UI 108 as a graphical UI (GUI), implementations also support other types of UIs such as a command line UI (CUI).

Implementations may ensure the privacy of data regarding the user(s) 104. In some cases, the collection and use of one or more of the user behavior data 128, the user data 126, or the social network data 130 may be contingent on the user 104 giving his or her permission (e.g., opting in) to the collection and use of the data. In some cases, the collection of use of one or more of the user behavior data 128, the user data 126, or the social network data 130 may be discontinued based on the user 104 withdrawing permission (e.g., opting out) for the collection and use of the data.

Figure 4:
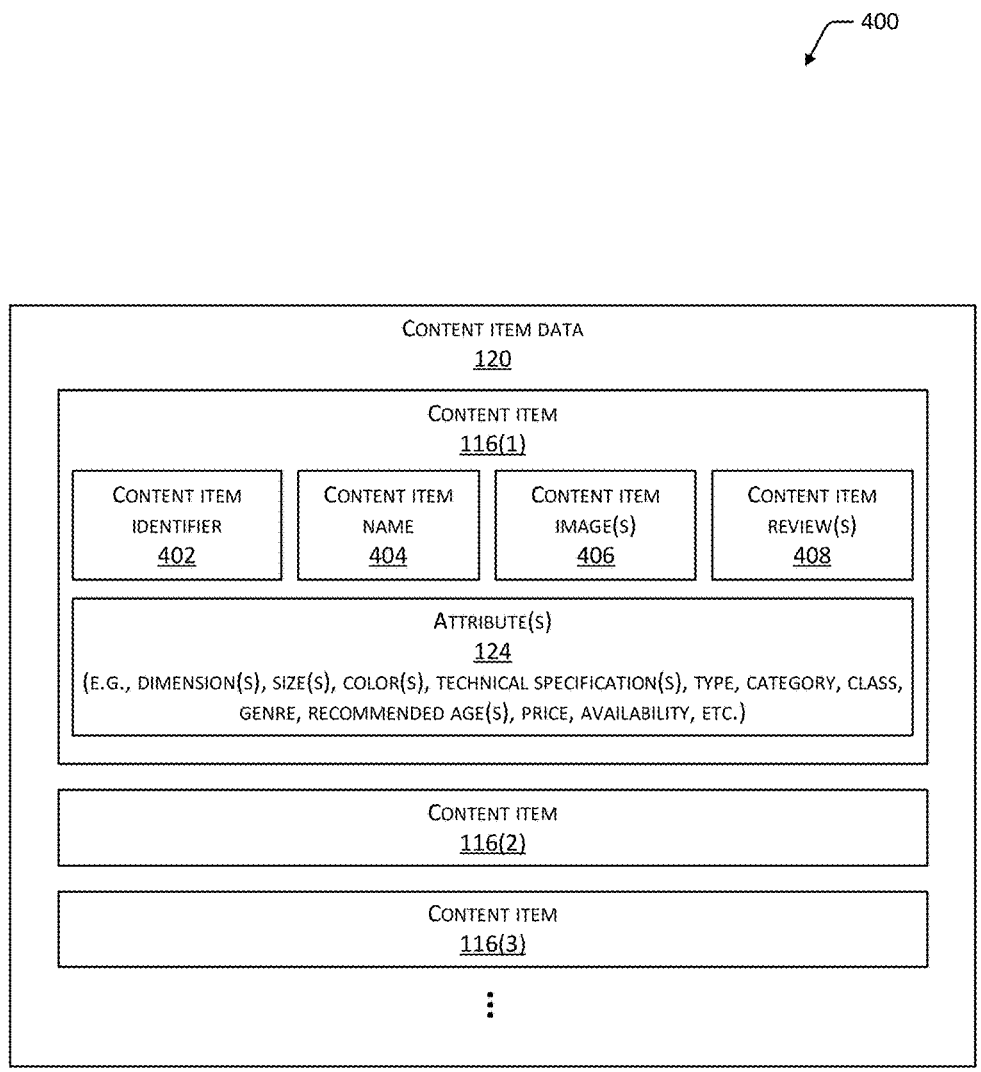
FIG. 4 depicts an example of content item data including a one or more attributes that describe content item(s).

FIG. 4 depicts an example 400 of the content item data 120. As shown in the example 400, the content item data 120 may describe any number of the content items 116. Each description of a content item 116 may include a content item identifier 402 that uniquely identifies the content item 116. In some cases, the content item identifier 402 may be a product identifier such as a stock keeping unit (SKU) number or an International Standard Book Number (ISBN). The description of the content item 116 may include a content item name 404 that provides a name or other descriptive information regarding the content item 116. In some cases, the description of the content item 116 may include one or more content item images 406 to be presented in the application 106 as part of the presented content item(s) 116. The description of the content item 116 may also include one or more content item review(s) 408, such as customer product review(s) that are presented in the application 106. The description of the content item 116 may also include other information regarding the content item 116, such as price, availability, manufacturer, seller, options for a particular model, size, or color, and so forth. The description of the content item 116 may also include the attribute(s) 124 as described above. A content item 116 may be associated with any number of attributes 124 that each describes some aspect or characteristic of the content item 116, as described above.

Although the example 400 may depict the content item data 120 as comprising a single table, implementations are not so limited. In some implementations, the content item data 120 may be stored in multiple tables or other data structures. In some cases, the multiple tables of the content item data 120 may be at least partly normalized or orthogonal, and linked to one another via one or more primary keys such as the content item identifier 402. For example, the content item image(s) 406 may be in one set of table(s) having a primary key that is the content item identifier 402, and the content item review(s) 408 may be in another set of table(s) having a primary key that is the content item identifier 402. Implementations support the use of any type or number of data structures to store the content item data 120, the user data 126, the user behavior data 128, the social network data 130, or other information.

Figure 5:
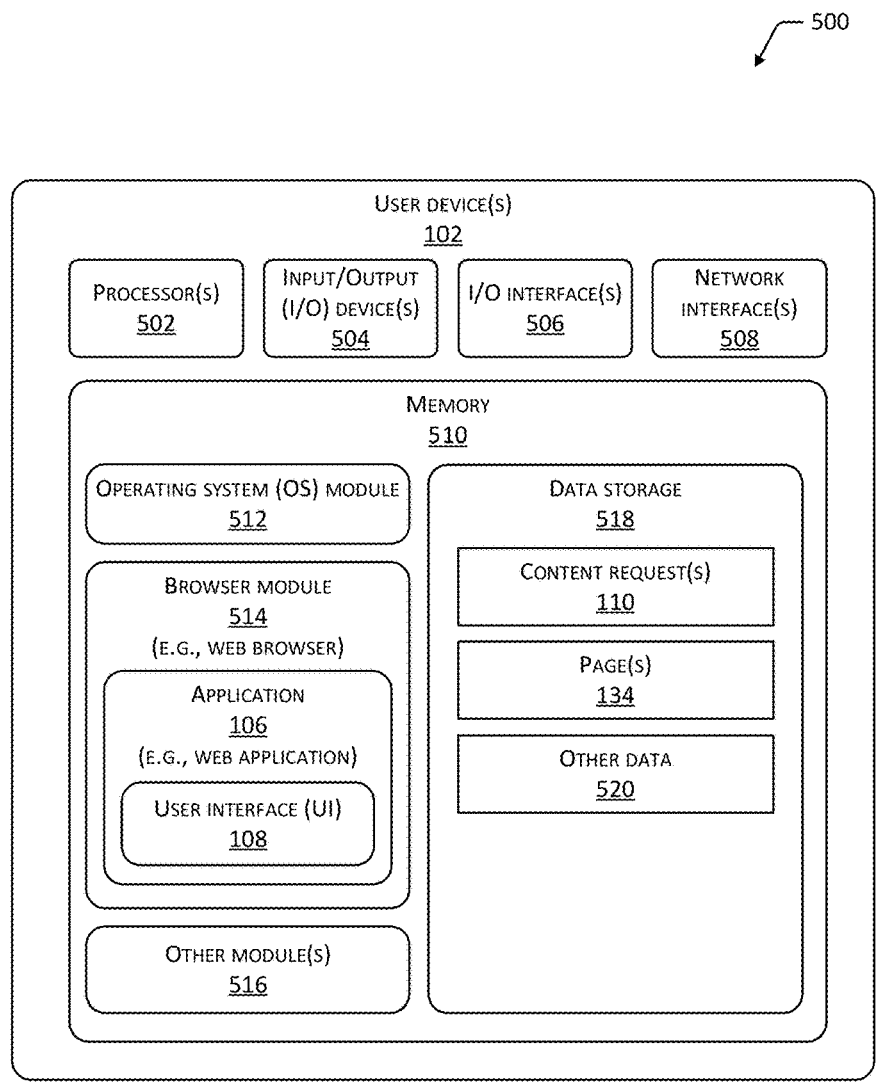
FIG. 5 depicts a block diagram of an example of the user device configured to enable a user to browse one or more content items presented through the user interface of an application.

FIG. 5 depicts a block diagram 500 of an example of the user device(s) 102. As shown in the block diagram 500, the user device(s) 102 may include one or more processors 502 (e.g., hardware-based processor(s)) configured to execute one or more stored instructions. The processor(s) 502 may comprise one or more cores.

The user device(s) 102 may include one or more input/output (I/O) devices 504. The I/O device(s) 504 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 504 may also include output devices such as a display, an audio output device (e.g., a speaker), a printer, a haptic output device, and so forth. The I/O device(s) 504 may be physically incorporated with the user device(s) 102 or may be externally placed.

The user device(s) 102 may include one or more I/O interfaces 506 to enable components or modules of the user device(s) 102 to control, interface with, or otherwise communicate with the I/O device(s) 504. The I/O interface(s) 506 may enable information to be transferred in or out of the user device(s) 102 or between components of the user device(s) 102, through serial communication, parallel communication, or other types of communication. For example, the I/O interface(s) 506 may comply with a version of the RS-232 standard for serial ports, or with a version of the IEEE 1284 standard for parallel ports. As another example, the I/O interface(s) 506 may be configured to provide a connection over Universal Serial Bus (USB) or Ethernet. In some cases, the I/O interface(s) 506 may be configured to provide a serial connection that is compliant with a version of the IEEE 1394 standard. The user device(s) 102 may also include one or more busses or other internal communications hardware or software that allow for the transfer of data between the various modules and components of the user device(s) 102.

The user device(s) 102 may include one or more network interfaces 508 that enable communications between the user device(s) 102 and other network accessible computing devices, such as the content server device(s) 112. The network interface(s) 508 may include one or more network interface controllers (NICs) or other types of transceiver devices configured to send and receive communications over a network.

The user device(s) 102 may include one or more memories, described herein as memory 510. The memory 510 comprises one or more computer-readable storage media (CRSM). The CRSM may include one or more of an electronic storage medium, a magnetic storage medium, an optical storage medium, a quantum storage medium, a mechanical computer storage medium, and so forth. The memory 510 provides storage of computer-readable instructions that may describe data structures, program modules, processes, applications, or other data for the operation of the user device(s) 102. In some implementations, the memory 510 may provide storage of computer-readable instructions or other information in a non-transitory format.

The memory 510 may include an operating system (OS) module 512. The OS module 512 may be configured to manage hardware resources such as the I/O device(s) 504, the I/O interface(s) 506, and the network interface(s) 508, and to provide various services to applications, processes, or modules executing on the processor(s) 502. The OS module 512 may include one or more of the following: any version of the Linux™ operating system; any version of iOS™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 510 may include one or more of the modules described above as executing on the user device(s) 102, such as the application 106. In cases where the application 106 is a web application, the application 106 may execute within a browser module 514 such as a web browser. Implementations support the use of any browser module 514, including but not limited to one or more of the following: Mozilla Firefox™; Microsoft Internet Explorer™; Google Chrome™; Apple Safari™; Rockmelt™; and so forth. Implementations also support the use of a web browser, such as the Amazon Silk™ browser, in which the processing of content is performed partly on the user device 102 and partly on the content server device(s) 112 or other device(s). In such cases, one or more web browser subsystems may execute on the user device 102, and one or more web browser subsystems may execute on one or more content server devices 112 or other device(s). In some implementations, the application 106 may be a native application that executes at least partly outside the browser module 514. The memory 510 may also include one or more other modules 516, such as a user authentication module or an access control module to secure access to the user device(s) 102, and so forth.

The memory 510 may include data storage 518 to store data for operations of the user device(s) 102. The data storage 518 may comprise a database, array, structured list, tree, or other data structure, and may be a relational or a non-relational datastore. The data storage 518 may store any of the types of data described above as being present on the user device(s) 102, including but not limited to the content request(s) 110 or the page(s) 134. The data storage 518 may also store other data 520 such as user authentication information, access control data, or other information. In some implementations, at least a portion of the information stored in the data storage 518 may be stored externally to the user device(s) 102, on other devices that may communicate with the user device(s) 102 via the I/O interface(s) 506 or via the network interface(s) 508.

Figure 6:
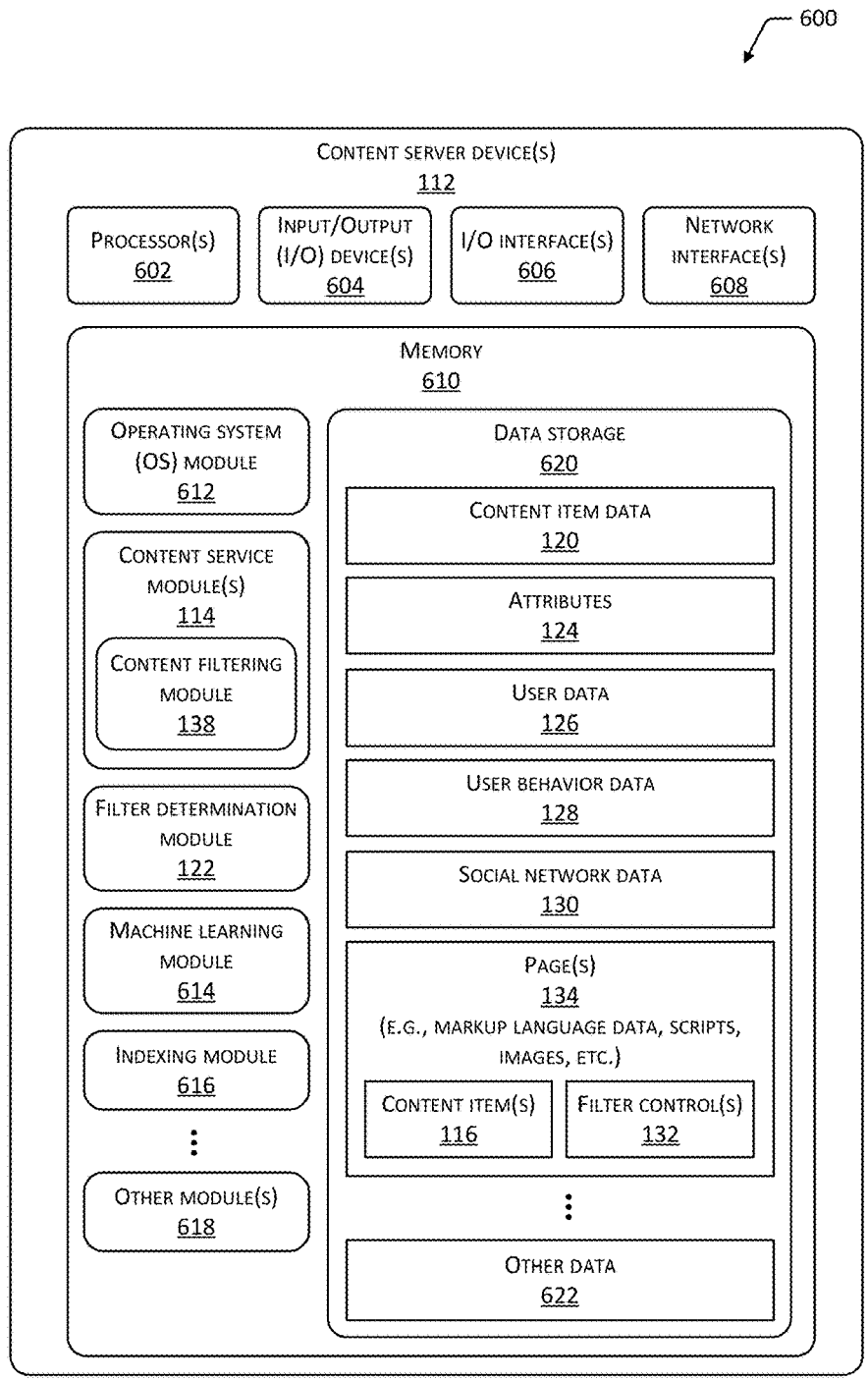
FIG. 6 depicts a block diagram of an example of the content server device(s) that may be configured to dynamically determine one or more filter controls for filtering content items presented in a user interface, based on attributes of the content items.

FIG. 6 depicts a block diagram 600 of an example of the content server device(s) 112. As shown in the block diagram 600, the content server device(s) 112 may include one or more processors 602 (e.g., hardware-based processor(s)) configured to execute one or more stored instructions. The processor(s) 602 may comprise one or more cores. The content server device(s) 112 may include one or more I/O devices 604, one or more I/O interfaces 606, and one or more network interfaces 608 as described above respectively with reference to the I/O device(s) 504, the I/O interface(s) 506, and the network interface(s) 508.

The content server device(s) 112 may include one or more memories, described herein as memory 610. The memory 610 comprises one or more CRSM, as described above with reference to the memory 510. The memory 610 may include an OS module 612 that is configured to manage hardware resources such as the I/O device(s) 604, the I/O interface(s) 606, and the network interface(s) 608, and to provide various services to applications, processes, or modules executing on the processor(s) 602. The OS module 612 may include one or more of the operating systems described above with reference to the OS module 512. The memory 610 may include one or more of the modules described above as executing on the content server device(s) 112, such as the content service module(s) 114, the content filtering module 138, or the filter determination module 122.

Some implementations may employ one or more machine learning techniques to determine which filter control(s) 132 to present in the application 106, or to determine an arrangement (e.g., an order) of the presented filter control(s) 132. In such cases, the memory 610 may include a machine learning module 614 configured to perform an analysis employing one or more machine learning algorithms or techniques. Implementations support the use of any supervised or unsupervised machine learning algorithms or techniques, including but not limited to one or more of the following: artificial neural networks, inductive logic programming, support vector machines (SVMs), clustering, classification, Bayesian networks, decision tree learning, association rule learning, reinforcement learning, representation learning, similarity learning, metric learning, sparse dictionary learning, and so forth. For example, an order of the filter control(s) 132 presented in the page(s) 134 of an application 106 may be varied across multiple page presentations for a particular user 104 or for multiple users 104. The results of the presentation order may be analyzed to determine which presentations resulted in sales of content items 116 and which did not result in sales. The order or arrangement of the filter control(s) 132, coupled with the sales result information, may then be employed as training data to train a classifier in a supervised machine learning analysis or in some other type of machine learning analysis. The classifier may be trained to determine an order or arrangement of the presentation of the filter control(s) 132 that may increase the likelihood of sales resulting from the presentation of the filter control(s) 132 and the content item(s) 116.

The memory 610 may also include an indexing module 616 to enable the generation of one or more search indexes based on presented or selected filter control(s) 132. In some implementations, the content service module(s) 114 or some other module(s) may detect that the user 104 has selected one or more filter control(s) 132 to filter the presentation of the content item(s) 116. The indexing module 616 may then be instructed to generate a search index to enable a search of the content item data 120 according to the attribute(s) 124 associated with the selected filter control(s) 132. For example, when a content request 110(2) is received indicating the selection of a filter control 132 labeled "not yellow", the indexing module 616 may be instructed to index the content item data 120 and generate a search index for the color attribute 124. The index may then be stored in the content item data 120 and employed during subsequent requests for filtered content items 116. In some cases, the more frequently requested filter control(s) 132 (e.g., included in a higher than threshold number or frequency of content requests 110) may be employed to generate new search indexes where such indexes have not previously been generated, to enable a more efficient processing of subsequent requests for filtered content items 116. In some cases, the indexing may proceed inline or synchronously with respect to the processing of the content request 110(2). The indexing may be performed at least partly contemporaneously with the session. Alternatively, the indexing may be performed offline or asynchronously with respect to the processing of the content request 110(2), e.g., as a scheduled batch job. The indexing may be performed at least partly non-contemporaneously with the session.

A search index may comprise a list, associative array, table, or other data structure in which the value of an attribute 124 is associated with (e.g., mapped to) one or more content items 116. A search index may be accessed to determine a set of content item(s) 116 for which an attribute 124 is a particular value, and the search index may facilitate such a determination to enable faster processing of search queries and content requests 110.

The memory 610 may also include one or more other modules 618, such as a user authentication module or an access control module to secure access to the content server device(s) 112, and so forth.

The memory 610 may include the data storage 620, which may store data for operations of the content server device(s) 112. The data storage 620 may comprise a database, array, structured list, tree, or other data structure, and may be a relational or a non-relational datastore. The data storage 620 may store data such as that described above as present on the content server device(s) 112, including the content item data 120, the attribute(s) 124, the user data 126, the user behavior data 128, the social network data 130, or the page(s) 134. The page(s) 134 may include one or both of the content item(s) 116 or the filter control(s) 132. The page(s) 134 may include any type of data and metadata as described above, such as markup language textual data, scripts, images, UI controls, and so forth. The data storage 620 may also store other data 622, such as user authentication information or access control data. In some implementations, at least a portion of the information stored in the data storage 620 may be stored externally to the content server device(s) 112, on other devices that may communicate with the content server device(s) 112 via the I/O interface(s) 606 or via the network interface(s) 608.

Figure 7:
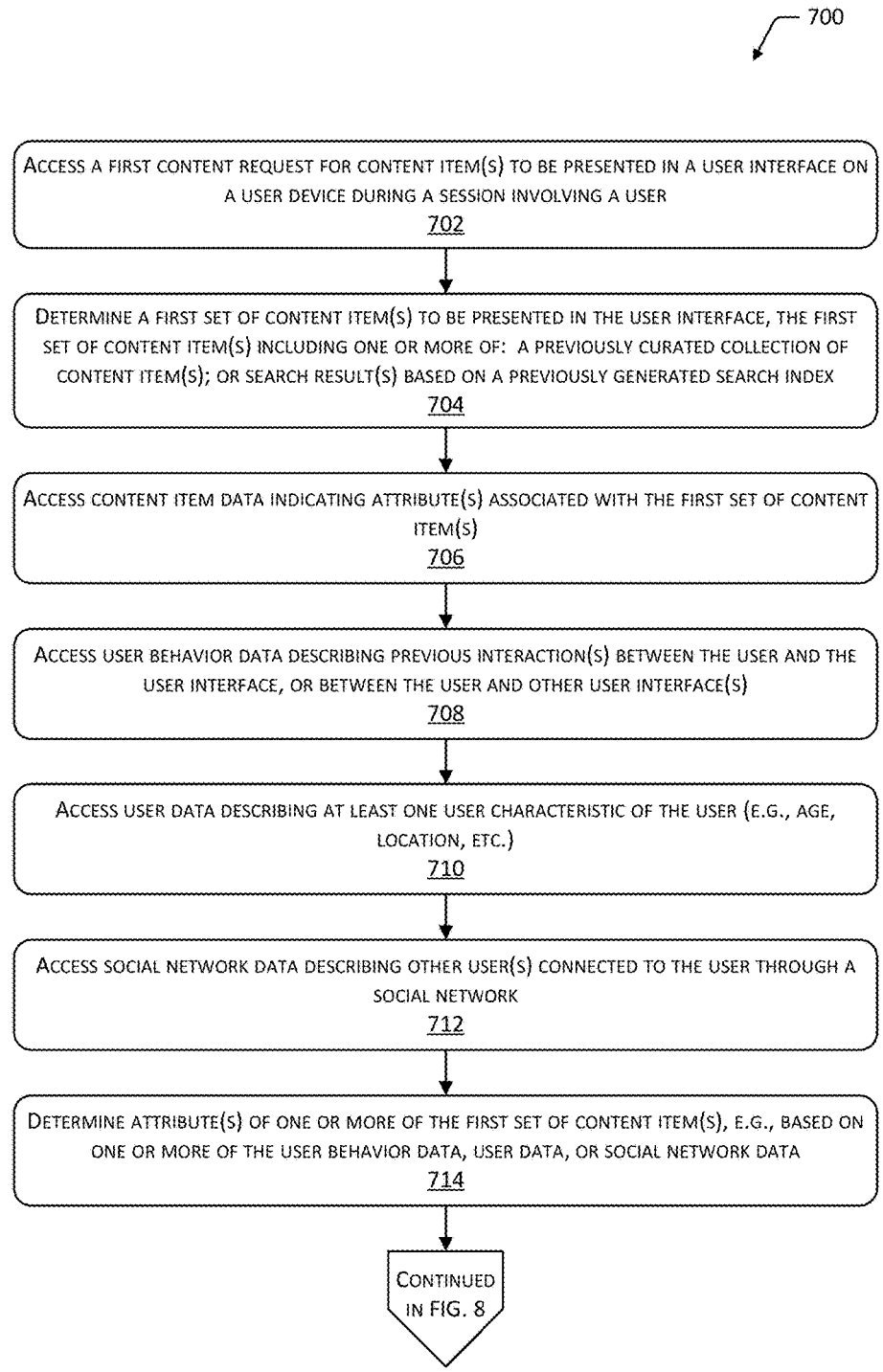
FIG. 7 depicts a flow diagram of a process for dynamically determining one or more filter controls for filtering content items presented in a user interface.

FIG. 7 depicts a flow diagram 700 of a process for dynamically determining one or more filter controls 132 for filtering the content items 116 presented in the UI 108. Operations of the process may be performed by the application 106, the content service module(s) 114, the content filtering module 138, the filter determination module 122, other modules executing on the user device 102 or the content server device(s) 112, or other modules executing on other devices.

At 702, the content request 110(1) is received or otherwise accessed. The content request 110(1) may be sent from the application 106 to the content service module(s) 114 to request the delivery of the first set of content item(s) 116(1) to be presented in the UI 108 of the application 106. The content request 110(1) may be sent in a session involving the user 104, such as a session in which the user 104 has been successfully authenticated to the application 106 or to the content service module(s) 114 based on user-provided credential(s) as described above.

At 704, the first set of content item(s) 116(1) may be determined in response to the content request 110(1). In some cases, the first set of content item(s) 116(1) may include a curated (e.g., previously generated) collection of content item(s) 116(1), and the content request 110(1) may specify the curated collection. In some cases, the first set of content item(s) 116(1) may include search result(s) generated by searching the content item data 120 using a search query or search terms specified in the content request 110(1). In such cases, the search may employ one or more search indexes that were previously generated to facilitate searches over the content item data 120. In both cases, the first set of content item(s) 116(1) may be determined based on substantially static operations, e.g., the use of previously generated search index(es) or previously curated collections of content item(s) 116.

At 706, the content item data 120 is accessed. The content item data 120 may indicate one or more attributes 124 associated with the first set of content item(s) 116(1).

At 708, the user behavior data 128 is accessed. The user behavior data 128 may describe one or more previous interactions between the user 104 and the UI 108, or between the user 104 and other UIs. The previous interaction(s) may have occurred in the current session or during previous sessions.

At 710, the user data 126 is accessed. The user data 126 may describe at least one user characteristic of the user 104, such as the user's age, location, gender, hobbies, interests, profession, group affiliation(s), and so forth.

At 712, the social network data 130 is accessed. The social network data 130 may describe one or more other users that are associated with the user 104 through one or more social networks, such as friends, family members, coworkers, acquaintances, and so forth. The social network data 130 may also describe one or more activities of the user 104 on the social network(s), such as published information (e.g., posts) describing liked or disliked products or product attributes.

At 714, the attribute(s) 124(1) are determined. In some cases, the attribute(s) 124 of the first set of content item(s) 116(1) are determined based on the content item data 120. The attribute(s) 124(1) may then be selected from the attribute(s) 124. The attribute(s) 124(1) may be a subset of the attribute(s) 124, or may include all of the attribute(s) 124. In some implementations, the attribute(s) 124(1) may be selected based on one or more of the user behavior data 128, the user data 126, the social network data 130, or other information. The selection of the attribute(s) 124(1) based on various types of data is described further with reference to FIGS. 9-11. The process may then continue as described with reference to FIG. 8.

Figure 8:
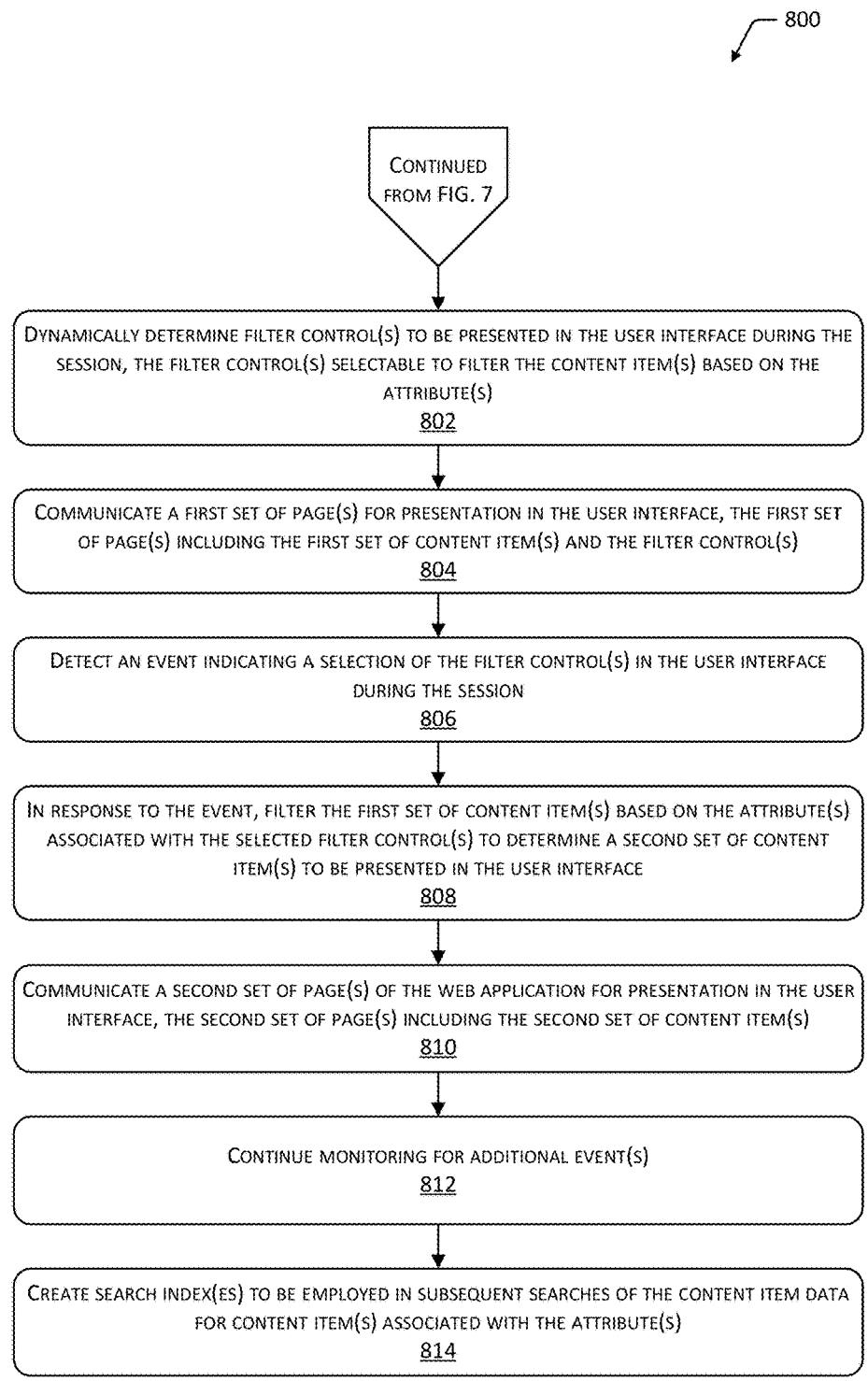
FIG. 8 depicts a flow diagram of a continuation of the process for dynamically determining the filter control(s).

FIG. 8 depicts a flow diagram 800 of a continuation of the process for dynamically determining the filter control(s) 132 and employing them for filtering the content item(s) 116. Operations of the process may be performed by the application 106, the content service module(s) 114, the content filtering module 138, the filter determination module 122, other modules executing on the user device 102 or the content server device(s) 112, or other modules executing on other devices.

At 802, one or more filter controls 132 may be determined for presentation in the UI 108 during the session involving the user 104. The filter control(s) 132 may be selectable (e.g., by the user 104) to request the filtering of the first set of content item(s) 116(1) based on one or more of the attributes 124(1). In some implementations, the filter control(s) 132 may be dynamically determined with respect to the content request 110(1), or may be determined in real time with respect to the content request 110(1). For example, as described above the selection of the attribute(s) 124(1) and the generation of the filter control(s) 132 may be performed in a same execution path as the processing of the content request 110(1).

At 804, a first set of page(s) 134(1) is communicated to the user device 102 for presentation in the UI 108. The first set of page(s) 134(1) may include the first set of content item(s) 116(1) and the filter control(s) 132.

At 806, an event is detected indicating a selection, during the session, of one or more of the filter controls 132 in the UI 108. In some cases, the selection may be made by the user 104 as described above with reference to FIGS. 2 and 3. The event may be detected by receiving the content request 110(2) that indicates the filter control selection 136.

At 808, in response to the event detected at 806, the first set of content item(s) 116(1) is filtered to determine the second set of content item(s) 116(2) to be presented in the UI 108. The filtering of the first set of content item(s) 116(1) may be based on the attribute(s) 124(1) according to the selected filter control(s) 132.

At 810, a second set of page(s) 134(2) is communicated to the user device 102 for presentation in the UI 108. The second set of page(s) 134(2) may include the second set of content item(s) 116(2). The second set of page(s) 134(2) may also include one or more filter controls 132. In some cases, the filter control(s) 132 sent in the second set of page(s) 134(2) may include at least some of the filter control(s) 132 sent in the first set of page(s) 134(1). The page(s) 134(2) may also include different filter control(s) 132 from those included in the page(s) 134(1). In some implementations, the selection of the filter control(s) 132 in the page(s) 134(1) may trigger a re-analysis of the content item(s) 116(2) to determine one or more additional filter control(s) 132 to include in the page(s) 134(2).

At 812, the process may continue monitoring for additional events that indicate the further selection, or deselection, of filter control(s) 132. Implementations support any number of iterations in which the user 104 requests the filtering of content items 116 through the selection of filter controls 132.

At 814, one or more search indexes may be created. As described above with reference to the indexing module 616, the search index(es) may enable a search of the content item data 120 according to the attribute(s) 124 associated with the selected filter control(s) 132.

Figure 9:
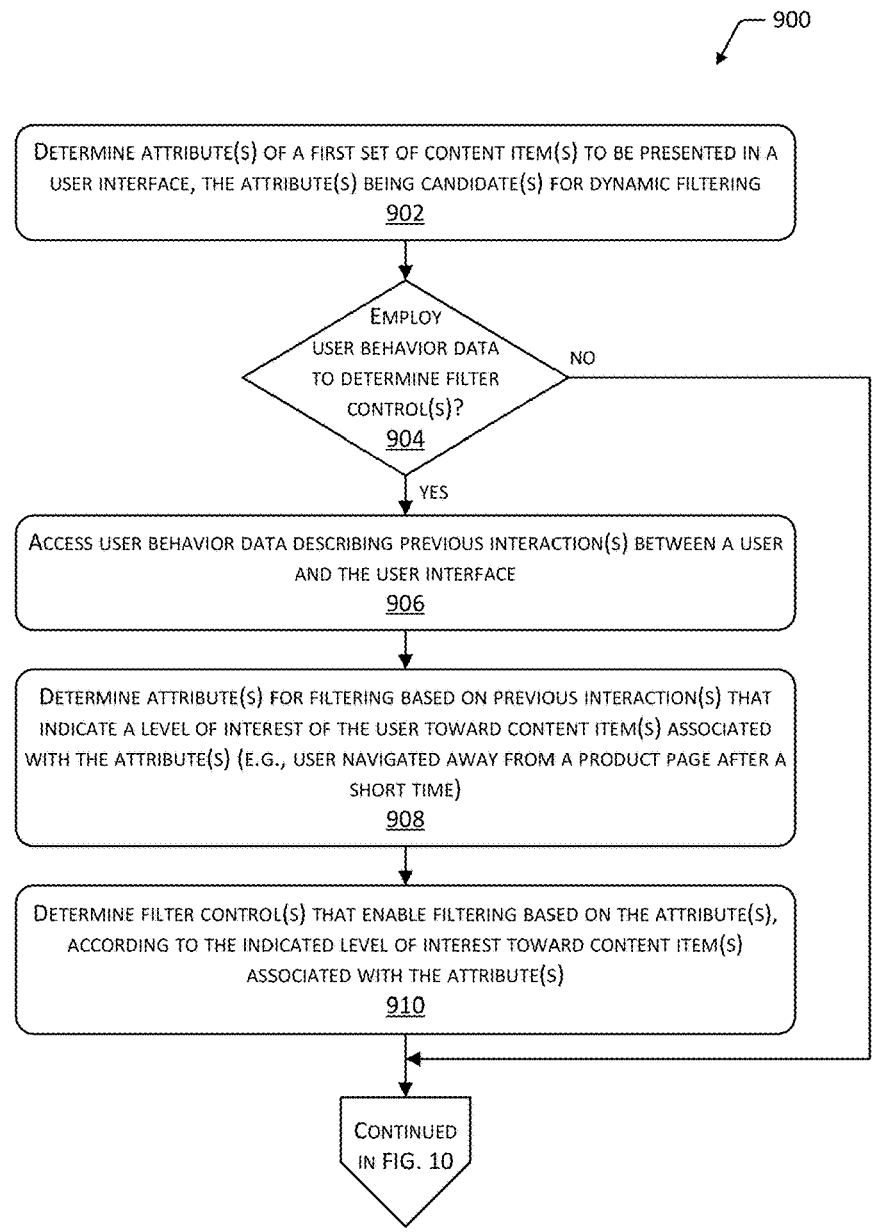
FIG. 9 depicts a flow diagram of a process for dynamically determining the filter control(s) based on user behavior data describing one or more previous interactions of user(s) with the user interface.

FIG. 9 depicts a flow diagram 900 of a process for dynamically determining the filter control(s) 132 based on the user behavior data 128 describing one or more previous interactions of the user(s) 104 with the UI 108 of the application 106, or with other application(s). Operations of the process may be performed by the application 106, the content service module(s) 114, the content filtering module 138, the filter determination module 122, other modules executing on the user device 102 or the content server device(s) 112, or other modules executing on other devices.

At 902, the first set of content item(s) 116 is analyzed to determine the attribute(s) 124 associated with each of the first set of content item(s) 116. As described with reference to FIG. 7, the attribute(s) 124 may be determined as those attribute(s) 124 associated with the first set of content item(s) 116 in the content item data 120. The attribute(s) 124 may be described as candidates for dynamic filtering in that each of the attribute(s) 124 may be considered for inclusion in the attribute(s) 124(1), e.g., those attribute(s) 124(1) for which the filter control(s) 132 are to be generated.

At 904, a determination is made whether the user behavior data 128 is to be employed in determining the filter control(s) 132. If not, the process may continue as described with reference to FIG. 10. If the user behavior data 128 is to be employed, the process may continue to 906.

At 906, the user behavior data 128 is accessed. At 908, the user behavior data 128 may be analyzed to determine the attribute(s) 124(1) to be used for filtering. In some implementations, the user behavior data 128 may be analyzed to identify one or more previous interactions of the user 104 with the application 106 (e.g., with the UI 108) or with other applications. The previous interaction(s) may indicate, or enable an inference of, a level of interest of the user 104 toward one or more content item(s) 116 associated with the attribute(s) 124. The indicated level of interest may be a positive interest, indicating that the user 104 may hold a positive opinion of the content item(s) 116 or their associated attribute(s) 124. For example, the user 104 may have previously written a favorable review of a particular product, searched for the product, purchased the product, flagged or bookmarked a product page for the product, added the product to a shopping cart. In some cases, the user 104 may have spent longer than a threshold time period viewing the product page, as indicated by the product page being presented in the UI 108 for at least the threshold time period. These instances of user behavior, or other types of behavior, may be employed to infer that the user 104 may hold a favorable opinion toward the product, and accordingly may hold a favorable opinion of other products that share similar attribute(s) 124 with the product.

In some cases, the indicated level of interest of the user 104 toward the content item(s) 116 may be a negative interest, indicating that the user 104 may hold a negative opinion of the content item(s) 116 or their associated attribute(s) 124. For example, the user 104 may have previously written an unfavorable review of a particular product, or viewed and then declined to purchase the product. In some cases, the user 104 may have spent a shorter than threshold time period viewing the product page for the product, as indicated by the product page being presented in the UI 108 for less than the threshold time period. In some cases, the previous interactions of the user 104 with the UI 108 may include the user's non-selection of the content item(s) 116, such as a failure to purchase a product or a navigation away from the product page describing the product. These instances of user behavior, or other types of behavior, may be employed to infer that the user 104 may hold an unfavorable opinion toward the product, and accordingly may hold an unfavorable opinion of other products that share similar attribute(s) 124 with the product.

In some implementations, the inferred level of interest of the user 104 toward various content item(s) 116, or toward various attribute(s) 124, may be supplemented, refined, or clarified by asking the user 104 one or more questions through the UI 108. For example, the user behavior data 128 may enable an inference that the user 104 may prefer not to view product pages describing western novels. To verify the inference, the UI 108 may be modified to query the user 104 "do you want to see western novels?" If the user 104 responds negatively, the corresponding attribute 124 for product type (e.g., book genre) "western fiction" may be designated as an attribute 124(1) to be used for filtering. A filter control 132 labeled "no western fiction" may be generated and presented in the UI 108.

The determined level of interest of the user 104 toward the content item(s) 116 that were the targets of the user's previous interactions may be employed to determine the attribute(s) 124(1) to be used for filtering. For example, a determination that the user 104 has demonstrated a negative or positive level of interest toward one or more content item(s) 116 may be employed to infer that the user 104 may hold the corresponding level of interest toward particular attribute(s) 124 of those content item(s) 116, and those attribute(s) 124 may be included in the attribute(s) 124(1) to be used for filtering.

At 910, one or more filter controls 132 may be generated or otherwise determined based on the attribute(s) 124(1) determined at 908. As described above, the filter control(s) 132 may enable positive filtering to select for a particular value of an attribute 124(1), e.g., to request the presentation of books having a genre attribute 124(1) of "western novel". The filter control(s) 132 may also enable negative filtering to select against a particular value of an attribute 124(1), e.g., to request the presentation of books not having the genre attribute 124(1) of "western novel". The process may then continue as described with reference to FIG. 10.

Figure 10:
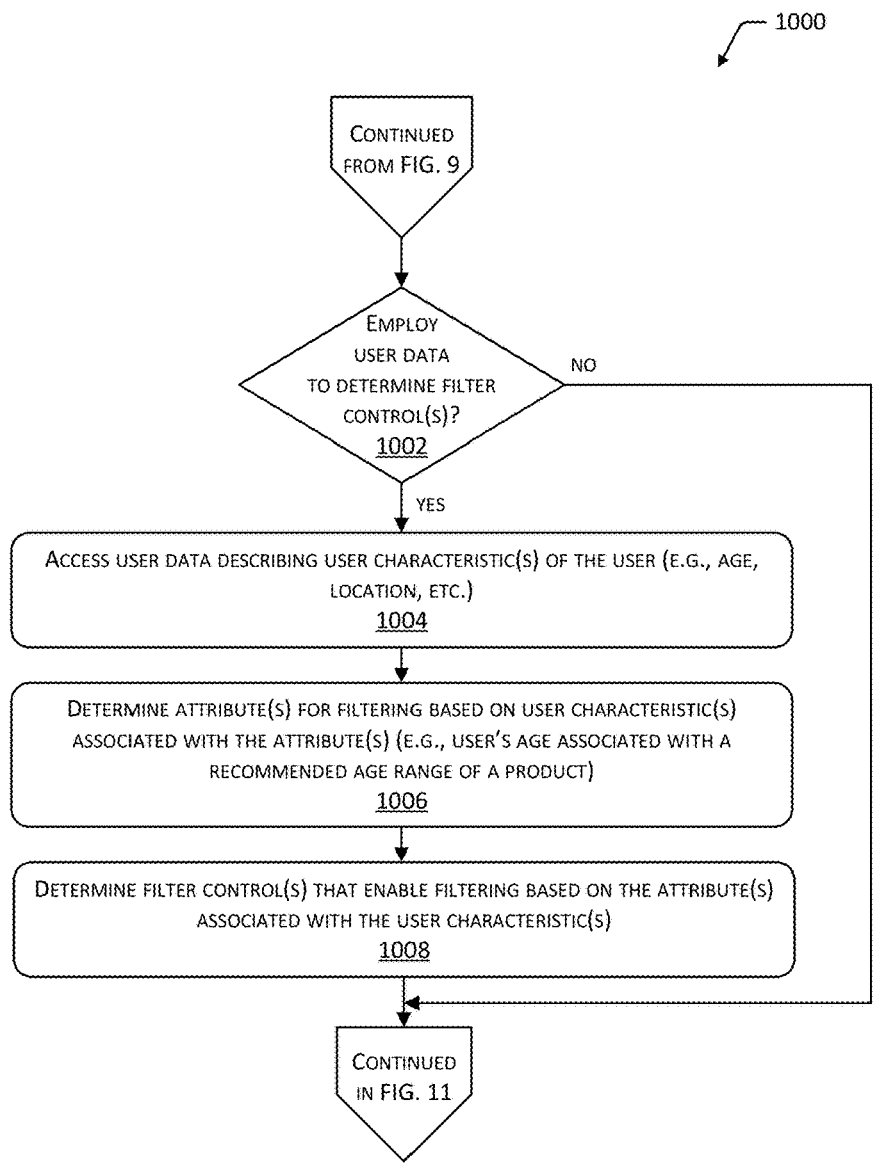
FIG. 10 depicts a flow diagram of a process for dynamically determining the filter control(s) based on user data describing one or more characteristics of the user(s).

FIG. 10 depicts a flow diagram 1000 of a process for dynamically determining the filter control(s) 132 based on the user data 126 describing one or more characteristics of the user(s) 104. Operations of the process may be performed by the application 106, the content service module(s) 114, the content filtering module 138, the filter determination module 122, other modules executing on the user device 102 or the content server device(s) 112, or other modules executing on other devices.

At 1002, a determination is made whether the user data 126 is to be employed in determining the filter control(s) 132. If not, the process may continue as described with reference to FIG. 11. If the user data 126 is to be employed, the process may continue to 1004.

At 1004, the user data 126 is accessed. At 1006, the user data 126 is analyzed to determine the attribute(s) 124(1) to be used for filtering. In some implementations, the user data 126 may be analyzed to determine one or more user characteristics associated with the attribute(s) 124 of the content item(s) 116(1). For example, the user's age may be employed to identify an attribute 124(1) that is the recommended age range of a content item 116. As another example, a user's location may be employed to identify an attribute 124(1) for filtering related to location, such as an attribute 124(1) for a book genre "books about Tokyo" based on the user 104 being located in Tokyo.

In some cases, multiple user characteristics may be employed to identify attribute(s) 124(1) for filtering. For example, the user 104 may have user characteristics that indicate the user 104 is age 15 years old and female. Those two user characteristics may be correlated to identify an attribute 124(1) for filtering clothing content items 116 based on clothing designed for, or marketed to, teenage females. In some cases, a user characteristic may be employed in conjunction with user behavior data 128 or social network data 130 to determine an attribute 124(1) for filtering. For example, the user data 126 may indicate that the user 104 is located in New York City, and one or more of the user data 126, the user behavior data 128, or the social network data 130 may indicate that the user 104 has an interest in local history. Those pieces of information may be employed to infer that the user 104 may have an interest in the history of New York City, and may be employed to identify an attribute 124(1) "New York City local history" for filtering content items 116 such as books, films, art, and so forth.

At 1008, one or more filter controls 132 may be generated or otherwise determined based on the attribute(s) 124(1) determined at 1006. The process may then continue as described with reference to FIG. 11.

Figure 11:
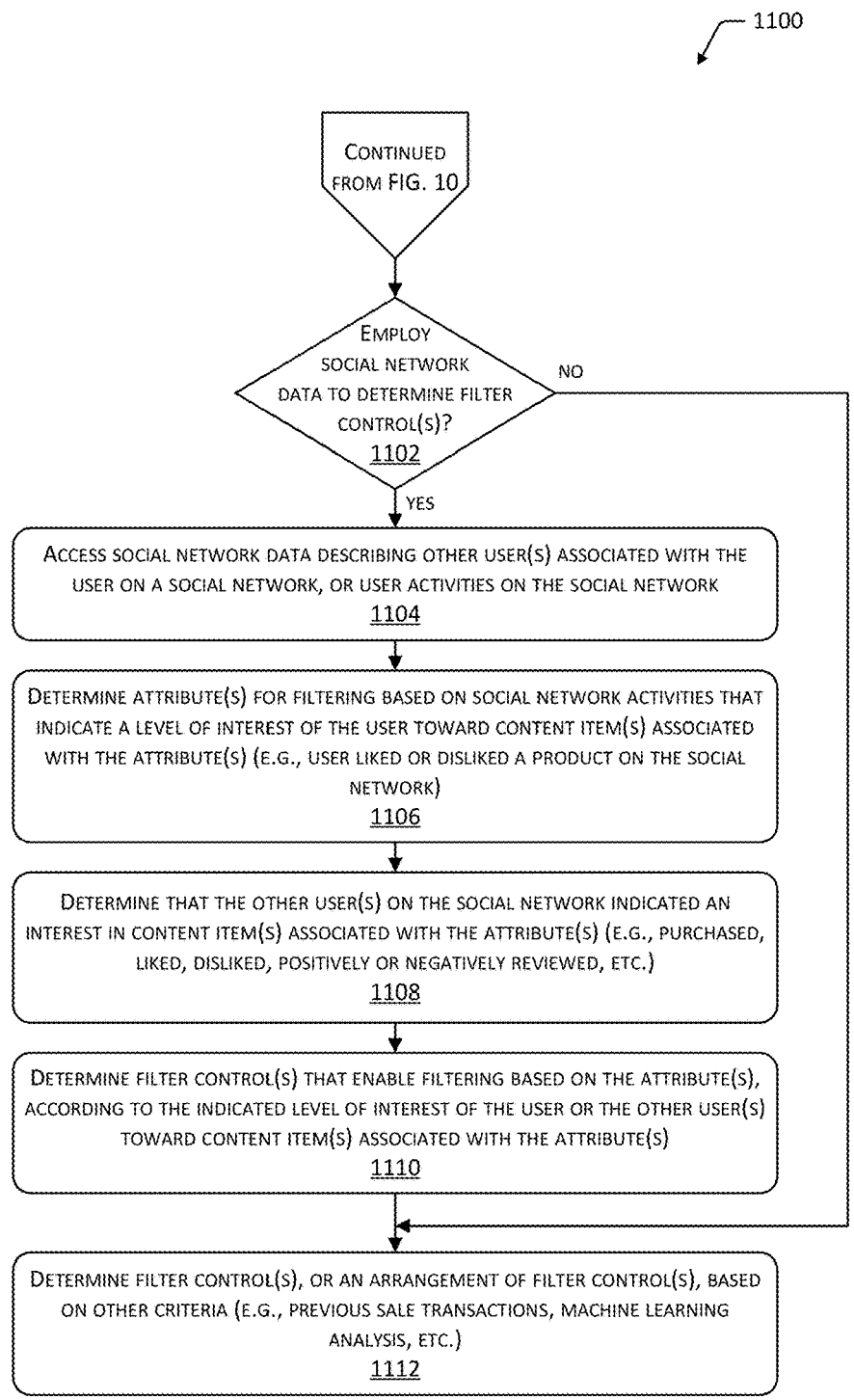
FIG. 11 depicts a flow diagram of a process for dynamically determining the filter control(s) based on social network data describing one or more activities of the user(s) on at least one social network, or based on other criteria.

FIG. 11 depicts a flow diagram 1100 of a process for dynamically determining the filter control(s) 132 based on the social network data 130 describing one or more activities of the user(s) 104 on at least one social network, or based on other criteria. Operations of the process may be performed by the application 106, the content service module(s) 114, the content filtering module 138, the filter determination module 122, other modules executing on the user device 102 or the content server device(s) 112, or other modules executing on other devices.

At 1102, a determination is made whether the social network data 130 is to be employed in determining the filter control(s) 132. If not, the process may proceed to 1112. If the social network data 130 is to be employed, the process may proceed to 1104.

At 1104, the social network data 130 is accessed. At 1106, the social network data 130 is analyzed to determine the attribute(s) 124(1) to be used for filtering. In some implementations, the social network data 130 may be analyzed to determine one or more interests or activities of the user 104, and those interests or activities may be associated with the attribute(s) 124. For example, the social network data 130 may indicate that the user 104 has an interest in soccer, based on postings or events associated with the user 104 on one or more social network web sites. That indication may be employed to identify an attribute 124(1) for filtering the content item(s) 116 associated with soccer, such as sports equipment products, or video content item(s) 116 related to soccer.

At 1108, a determination may be made that other user(s) on one or more social network(s) indicated an interest (e.g., positive or negative interest) in one or more content items 116 associated with the attribute(s) 124. For example, such an interest may be a posting indicating a liking, a disliking, a purchase, a positive review, or a negative review of a product. The determination of friends' interest(s) may be employed to determine a filter control 132 to filter content items 116 for "items my friends like" (or "not items my friends dislike") as described with reference to FIG. 2.

At 1110, one or more filter controls 132 may be generated or otherwise determined based on the attribute(s) 124(1) determined at 1106, or based on the friends' interest(s) identified at 1108.

At 1112, the filter control(s) 132 may be further determined based on other criteria. For example, as described with reference to FIG. 6, machine learning analysis may be employed to determine the filter control(s) 132 or to determine an arrangement of the filter control(s) 132 in the UI 108. Other data may also be employed to determine the filter control(s) 132. For example, sales information may be employed to determine which filter control(s) 132 are more likely than others to lead to sales transactions through the UI 108. Such filter control(s) 132 may be included in the UI 108, or maybe arranged in a more prominent location relative to other filter control(s) 132.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
receiving a first content request based on information provided by a web application executing in a web browser during a session;
in response to the first content request, determining a first set of content items to be presented in the web application executing in the web browser during the session, the session including a plurality of interactions between a user and the web application;
accessing content item data indicating a plurality of attributes associated with the first set of content items;
determining attributes of the first set of content items from the plurality of attributes, the attributes identified as filterable attributes for filtering the first set of content items;
accessing user data describing at least one characteristic of the user;
accessing user behavior data describing at least one previous interaction with the user;
based on the attributes of the first set of content items, and one or more of the user data or the user behavior data, determining at least one of the attributes of the first set of content items to include in a first filter control to be presented in the web application when the first set of content items are communicated, the first filter control including the at least one of the attributes selectable from the first filter control to filter the first set of content items based on the at least one of the attributes of the first set of content items, and one or more of the user data or the user behavior data, the determining of the first filter control being performed dynamically with respect to the determining of the first set of content items;
communicating, within a predetermined time after receiving the first content request, the first set of content items and the first filter control, to the web browser for execution in the web application;
in response to a second content request indicating a selection of the at least one of the attributes from the first filter control after the first set of content items and the first filter control are communicated to the web application during the session, filtering the first set of content items based on the selection of the at least one of the attributes from the first filter control to determine a second set of content items to be presented in the web application, the second set of content items being a subset of the first set of content items;
determining attributes of the second set of content items from the plurality of attributes, the attributes identified as filterable attributes for filtering the second set of content items using a second filter control;
based on the second content request indicating the selection of the at least one of the attributes from the first filter control being communicated to the web application during the session, triggering a re-analysis of the second set of content items to determine at least one of the attributes of the second set of content items to include in the second filter control to be presented in the web application when the second set of content items are communicated, the second filter control including the at least one of the attributes selectable from the second filter control to filter the second set of content items based on the at least one of the attributes of the second set of content items, and one or more of the user data or the user behavior data, the determining of the second filter control being performed dynamically with respect to the determining of the second set of content items; and
communicating the second set of content items and the second filter control to the web application for presentation in the web browser during the session.

2. The method of claim 1, wherein the session is a Hypertext Transport Protocol (HTTP) session, the first filter control further comprising a positive filter control to request presentation of content items having content item data that includes the at least one of the attributes of the first set of content items selectable from the first filter control and a negative filter control to request presentation of content items having content item data not having the at least one of the attributes of the first set of content items selectable from the first filter control.

3. The method of claim 1, further comprising:
creating a search index to be employed in subsequent searches of the content item data for content items associated with the at least one of the attributes of the first set of content items, and one or more of the user data or the user behavior data, the creating of the search index being responsive to the second content request indicating the selection of the at least one of the attributes from the first filter control.

4. The method of claim 1, further comprising:
accessing a search index describing the at least one previous interaction with the user, the at least one previous interaction with the user including an interaction of the user with the web application; and
wherein the determining of the attributes of the first set of content items is based at least partly on the interaction of the user with the web application comprising a non-selection by the user of a content item associated with the attributes of the first set of content items, and one or more of the user data or the user behavior data.

5. The method of claim 4, wherein the interaction of the user with the web application further comprises a navigation by the user away from a web page presenting the content item associated with the attributes of the first set of content items, and one or more of the user data or the user behavior data.

6. A system, comprising:
at least one computing device configured to implement one or more services, the one or more services configured to:
receive a first content request based on information provided by a user interface during a session;
in response to the first content request, determine a first set of content items to be presented in the user interface during the session;
determine access content item data indicating a plurality of attributes associated with the first set of content items;
determine attributes of the first set of content items from the plurality of attributes associated with the first set of content items presented in the user interface during the session, the session including a plurality of interactions of the user with the user interface;

access user data describing at least one characteristic of a user;

access user behavior data describing at least one previous interaction of the user;

based on the attributes of the first set of content items, and one or more of the user data or the user behavior data, determine at least one of the attributes of the first set of content items to include in a first filter control to be presented in the user interface during the session, the first filter control including the at least one of the attributes selectable from the first filter control to filter the first set of content items based on the at least one of the attributes of the first set of content items, and based on one or more of the user data or the user behavior data;

add the first filter control to the user interface during the session;

detect an event indicating a selection of the at least one of the attributes from the first filter control during the session;

in response to the event, filter the first set of content items based on the selection of the at least one of the attributes of the first set of content items from the first filter control to determine a second set of content items;

determine attributes of the second set of content items from the plurality of attributes, the attributes identified as filterable attributes for filtering the second set of content items using a second filter control;

based on a second content request, re-analyze the second set of content items to determine at least one of the attributes of the second set of content items to include in the second filter control to be presented for selection to filter the second set of content items; and present the second set of content items and the second filter control in the user interface during the session.

7. The system of claim 6, wherein:
the one or more services are further configured to access a search index describing the at least one previous interaction of the user with the user interface; and
the determining of the attributes of the first set of content items is based at least partly on the at least one previous interaction of the user with the user interface indicating a level of interest of the user toward a first content item of the first set of content items associated with the attributes of the first set of content items, and one or more of the user data or the user behavior data.

8. The system of claim 7, wherein:
the at least one previous interaction of the user with the user interface includes a navigation away from a presentation of the first content item of the first set of content items in the user interface within a time period that is less than a threshold time period; and
the first filter control is selectable to determine the second set of content items as a subset of the first set of content items that are not associated with the at least one of the attributes of the first set of content items.

9. The system of claim 7, wherein:
the at least one previous interaction of the user with the user interface includes a presentation of the content item in the user interface for at least a threshold time period; and
the first filter control is selectable to determine the second set of content items as a subset of the first set of content items that are associated with the at least one of the attributes of the first set of content items, and one or more of the user data or the user behavior data.

10. The system of claim 6, wherein:
the session comprises the plurality of interactions of the user with the user interface.

11. The system of claim 6, wherein:
the at least one user characteristic includes an age of the user;
the at least one of the attributes of the first set of content items is a recommended age range for the first set of content items; and
the first filter control is selectable to determine the second set of content items as a subset of the first set of content items for which the recommended age range includes the age of the user.

12. The system of claim 6, wherein:
the session comprises the plurality of interactions between a user and the user interface;
the one or more services are further configured to access social network data describing at least one other user connected to the user through a social network; and
the first filter control is selectable to determine the second set of content items as a subset of the first set of content items for which the at least one other user indicated an interest on the social network.

13. The system of claim 6, wherein:
the user interface is included in a web site comprising one or more web pages at least partly described using a markup language;
the session is a Hypertext Transport Protocol (HTTP) session comprising the plurality of interactions between a user and the user interface;
the HTTP session includes an authentication of the user through the user interface; and
the first filter control further comprises a positive filter control to request presentation of the first set of content items having the at least one of the attributes and a negative filter control to request presentation of a third set of content items not having the at least one of the attributes.

14. The system of claim 6, wherein the one or more services are further configured to:
detect a subsequent event indicating a selection of at least one other filter control during the session, the at least one other filter control being selectable to filter the first set of content items based on at least one other attribute;
in response to the subsequent event, filter the second set of content items based on the at least one other attribute to determine a third set of content items; and
present the third set of content items in the user interface during the session.

15. One or more computer-readable media storing instructions which, when executed by at least one processor, instruct the at least one processor to perform actions comprising:
receiving a first content request based on information provided by a user interface;
in response to the first content request, determining a first set of content items to be presented in the user interface;
accessing content item data indicating a plurality of attributes associated with the first set of content items;
determining attributes of the first set of content items that describe one or more of the first set of content items presented in the user interface;

accessing user data describing at least one characteristic of the user;

accessing user behavior data describing at least one previous interaction with the user;

based on the attributes of the first set of content items, and one or more of the user data or the user behavior data including at least one previous interaction between the user and the user interface indicating a level of interest of the user toward a first content item of the first set of content items, determining at least one of the attributes of the first set of content items to include in a first filter control to be presented in the user interface, the first filter control being selectable to filter the first set of content items;

detecting an event indicating a selection of the at least one of the attributes from the first filter control;

in response to the event, filtering the first set of content items to determine a second set of content items based on the selection of the at least one of the attributes of the first set of content items from the first filter control to determine a second set of content items;

determining attributes of the second set of content items from the plurality of attributes, the attributes identified as filterable attributes for filtering the second set of content items using a second filter control;

based on a second content request, re-analyzing the second set of content items to determine at least one of the attributes of the second set of content items to include in the second filter control to be presented for selection to filter the second set of content items; and providing the second set of content items and the second filter control for presentation in the user interface.

16. The one or more computer-readable media of claim 15, wherein the determining of the first filter control is based at least partly on a machine learning analysis.

17. The one or more computer-readable media of claim 16, wherein:

the machine learning analysis employs a supervised machine learning algorithm to determine an arrangement of the first filter control in the user interface to increase a likelihood of a sale transaction through the user interface.

18. The one or more computer-readable media of claim 15, wherein the determining of the first filter control is performed dynamically and in real time with respect to the first content request causing the first set of content items to be presented in the user interface.

19. The one or more computer-readable media of claim 15, wherein:

the determining of the attribute, the determining of the first filter control, and the providing of the second set of content items are performed at least partly during a session that includes a plurality of interactions between the user and the user interface;

the session includes an authentication of the user through the user interface; and the first filter control further comprises a positive filter control to request presentation of the first set of content items having the at least one of the attributes of the first set of content items and a negative filter control to request presentation of a third set of content items not having the at least one of the attributes of the first set of content items.

20. The one or more computer-readable media of claim 15, the actions further comprising:

creating a search index to be employed in subsequent searches for content items associated with the at least one of the attributes of the first set of content items, and one or more of the user data or the user behavior data, the creating of the search index being responsive to the event indicating the selection of the first filter control.

* * * * *